(12) United States Patent
Muramatsu et al.

(10) Patent No.: US 7,453,416 B2
(45) Date of Patent: Nov. 18, 2008

(54) IMAGE DISPLAYING DEVICE

(75) Inventors: Hideo Muramatsu, Shinshiro (JP);
Tomoyuki Atsumi, Toyohashi (JP);
Hiroaki Ikeda, Itami (JP)

(73) Assignee: Minolta Co., Ltd., Osaka (JP)

( * ) Notice: Subject to any disclaimer, the term of this patent is extended or adjusted under 35 U.S.C. 154(b) by 531 days.

(21) Appl. No.: 10/271,776

(22) Filed: Oct. 17, 2002

(65) Prior Publication Data
US 2003/0076277 A1 Apr. 24, 2003

(30) Foreign Application Priority Data
Oct. 19, 2001 (JP) ............... 2001-322662

(51) Int. Cl.
*G09G 5/00* (2006.01)
(52) U.S. Cl. .................. 345/1.1; 345/901; 434/317
(58) Field of Classification Search ........... 345/1.1–1.3, 345/901, 5, 156, 169; 434/317, 319
See application file for complete search history.

(56) References Cited

U.S. PATENT DOCUMENTS

| | | | |
|---|---|---|---|
| 5,414,444 A * | 5/1995 | Britz | 345/156 |
| 5,534,888 A * | 7/1996 | Lebby et al. | 345/672 |
| 6,124,851 A * | 9/2000 | Jacobson | 345/206 |
| 6,703,571 B2 * | 3/2004 | Nishimoto et al. | 200/6 A |
| 6,788,292 B1 * | 9/2004 | Nako et al. | 345/173 |
| 2002/0015019 A1 * | 2/2002 | Kinjo | 345/156 |
| 2002/0055938 A1 * | 5/2002 | Matsuo et al. | |
| 2004/0070633 A1 * | 4/2004 | Nakamura et al. | 345/860 |

FOREIGN PATENT DOCUMENTS

| JP | 2-219131 | * | 8/1990 |
|---|---|---|---|
| JP | 02-219131 A | | 8/1990 |
| JP | 404355786 | * | 12/1992 |
| JP | 6-290017 | | 10/1994 |
| JP | 07-110664 A | | 4/1995 |
| JP | 407110664 | * | 4/1995 |
| JP | 8-076926 | | 3/1996 |
| JP | 9-134370 | | 5/1997 |
| JP | 2000-293120 | * | 10/2000 |
| JP | 2000-293120 A | | 10/2000 |
| JP | 2002-287690 A | | 10/2002 |

* cited by examiner

*Primary Examiner*—Regina Liang
(74) *Attorney, Agent, or Firm*—Morrison & Foerster LLP

(57) ABSTRACT

An image displaying device includes a first display portion capable of changing display contents and provided at a surface side of a main body, a second display portion capable of changing display contents and provided at a lower surface side of the main body and a detector which detects a turning-over of the main body. The display contents of the first or second display portion is changed by a display controller depending on detected results of the detector.

3 Claims, 33 Drawing Sheets

<DISPLAYING SIDE AND DISPLAYED IMAGE>

| | OPERATION | SENSOR INPUT | | | DISPLAYED PAGE ON EACH DISPLAYING SIDE | | | | | |
|---|---|---|---|---|---|---|---|---|---|---|
| | | SWITCH 31 | SWITCH 32 | SWITCH 33 | FIRST SIDE | SECOND SIDE | THIRD SIDE | FOURTH SIDE | FIFTH SIDE | SIXTH SIDE |
| INITIAL STATE | | ON | ON | OFF | 1 | 2 | 3 | 4 | 5 | 6 |
| PAGE FORWARD DIRECTION UPDATING | FIRST AND SECOND SIDES ARE OPENED TOWARD THE LEFT | OFF | ON | OFF | 1 | 2 | 3 | 4 | 5 | 6 |
| | THIRD AND FOURTH SIDES ARE OPENED TOWARD THE LEFT | OFF | OFF | OFF | 7 | 2 | 3 | 4 | 5 | 6 |
| | FIFTH AND SIXTH SIDES ARE ROTATED TOWARD THE LEFT (FIRST SIDE IS ROTATED TOWARD THE RIGHT) | ON | OFF | OFF | 7 | 2 | 3 | 4 | 5 | 6 |
| | FIRST AND SECOND SIDES ARE OPENED TOWARD THE LEFT | ON | OFF | OFF | 7 | 2 | 3 | 4 | 5 | 6 |
| | | OFF | OFF | OFF | 7 | 8 | 3 | 4 | 5 | 6 |
| | | OFF | OFF | ON | 7 | 8 | 9 | 4 | 5 | 6 |
| | THIRD AND FOURTH SIDES ARE OPENED TOWARD THE LEFT | ON | OFF | OFF | 7 | 8 | 9 | 4 | 5 | 6 |
| | | OFF | OFF | OFF | 7 | 8 | 9 | 4 | 5 | 6 |
| PAGE REVERSE DIRECTION UPDATING | THIRD AND FOURTH SIDES ARE OPENED TOWARD THE RIGHT | OFF | OFF | OFF | 7 | 8 | 9 | 10 | 5 | 6 |
| | FIRST AND SECOND SIDES ARE ROTATED TOWARD THE RIGHT (SIXTH SIDE IS ROTATED TOWARD THE LEFT) | OFF | ON | OFF | 7 | 8 | 9 | 10 | 11 | 6 |
| | FIFTH AND SIXTH SIDES ARE OPENED TOWARD THE RIGHT | OFF | OFF | OFF | 7 | 8 | 9 | 10 | 11 | 6 |
| | | OFF | OFF | ON | 7 | 8 | 9 | 4 | 5 | 6 |

FIG.7

<DISPLAYING SIDE AND DISPLAYED IMAGE>

| OPERATION | | SENSOR INPUT | | | | DISPLAYED PAGE ON EACH DISPLAYING SIDE | | | |
|---|---|---|---|---|---|---|---|---|---|
| | | ELEMENT 51 | ELEMENT 52 | ELEMENT 53 | ELEMENT 54 | FIRST SIDE | SECOND SIDE | THIRD SIDE | FOURTH SIDE |
| INITIAL STATE | | OFF | OFF | OFF | OFF | 1 | 2 | 3 | 4 |
| PAGE FORWARD DIRECTION UPDATING | FIRST AND SECOND SIDES ARE OPENED TOWARD THE LEFT | OFF | ON | OFF | OFF | 1 | 2 | 3 | 4 |
| | THIRD AND FOURTH SIDES ARE ROTATED TOWARD THE LEFT | OFF | OFF | OFF | ON | 1 | 2 | 3 | 4 |
| | FIRST AND SECOND SIDES ARE OPENED TOWARD THE LEFT | OFF | ON | OFF | OFF | 5 | 2 | 3 | 4 |
| | THIRD AND FOURTH SIDES ARE ROTATED TOWARD THE LEFT | OFF | OFF | OFF | ON | 5 | 6 | 3 | 4 |
| | FIRST AND SECOND SIDES ARE OPENED TOWARD THE LEFT | OFF | ON | OFF | OFF | 5 | 6 | 7 | 4 |
| | THIRD AND FOURTH SIDES ARE ROTATED TOWARD THE LEFT | OFF | OFF | OFF | ON | 5 | 6 | 7 | 8 |
| PAGE REVERSE DIRECTION UPDATING | THIRD AND FOURTH SIDES ARE OPENED TOWARD THE RIGHT | OFF | OFF | ON | OFF | 9 | 6 | 7 | 8 |
| | FIRST AND SECOND SIDES ARE ROTATED TOWARD THE RIGHT | ON | OFF | OFF | OFF | 9 | 6 | 7 | 8 |
| | THIRD AND FOURTH SIDES ARE OPENED TOWARD THE RIGHT | OFF | OFF | ON | OFF | 5 | 6 | 7 | 4 |
| | FIRST AND SECOND SIDES ARE ROTATED TOWARD THE RIGHT | ON | OFF | OFF | OFF | 5 | 6 | 7 | 4 |
| | THIRD AND FOURTH SIDES ARE OPENED TOWARD THE RIGHT | OFF | OFF | OFF | OFF | 1 | 2 | 3 | 4 |
| | FIRST AND SECOND SIDES ARE ROTATED TOWARD THE RIGHT | OFF | OFF | OFF | OFF | 1 | 2 | 3 | 4 |

FIG.21

| OPERATION | SENSOR INPUT | | | | DISPLAYED PAGE ON DISPLAYING SIDE | |
|---|---|---|---|---|---|---|
| | SWITCH 81 | SWITCH 82 | SWITCH 83 | SWITCH 84 | SURFACE SIDE | REAR SIDE |
| INITIAL STATE | ON | OFF | OFF | OFF | 1 | 2 |
| PAGE FORWARD DIRECTION UPDATING | OFF | ON | OFF | OFF | 1 | 2 |
| | OFF | OFF | ON | OFF | 2 | 3 |
| | OFF | OFF | OFF | ON | 2 | 3 |
| | ON | OFF | OFF | OFF | 3 | 4 |
| | OFF | ON | OFF | OFF | 3 | 4 |
| | OFF | OFF | ON | OFF | 4 | 5 |
| | OFF | OFF | OFF | ON | 4 | 5 |
| PAGE REVERSE DIRECTION UPDATING | OFF | OFF | ON | OFF | 4 | 5 |
| | OFF | OFF | OFF | ON | 4 | 5 |
| | ON | OFF | OFF | OFF | 3 | 4 |
| | OFF | OFF | ON | OFF | 3 | 4 |
| | OFF | ON | OFF | OFF | 2 | 3 |
| | OFF | OFF | OFF | OFF | 2 | 3 |
| | ON | OFF | OFF | OFF | 1 | 2 |

FIG.29

IMAGE DISPLAYING DEVICE

This application claims priority to Japanese Patent Application No. 2001-322662 filed on Oct. 19, 2001, the disclosure of which is incorporated by reference in its entirety.

BACKGROUND OF THE INVENTION

1. Field of the Invention

The present invention relates to an image displaying device that can be applied to an electronic book or the like capable of displaying electronic documents including character/image information on a display screen so that a user can obtain the information in the same way as books, newspapers, magazines and the like.

2. Description of Related Art

It is necessary for an electronic book to update the display contents by page. As the technology for updating the display contents, for example, Japanese Unexamined Laid-open Patent Publication No. H9-134370 discloses that display contents of an electronic book are updated by input operations of specific switches provided thereto. Furthermore, Japanese Unexamined Laid-open Patent Publication No. H8-76926 discloses that display contents are updated in accordance with a motion of an operator's finger relative to a touch sensor of a display portion.

On the other hand, Japanese Unexamined Laid-open Patent Publication No. H6-290017 discloses that a false page member for detecting a page turning-over operation is disposed on a fixed display portion are updated by a page turning-over operation.

However, according to the former technology in which display contents are updated by an updating method peculiar to an equipment such as a touch sensor or a switch input, the specific switching operation is troublesome and that the switching operation gives a feeling completely different from a page turning-over feeling of paper books.

Furthermore, according the latter technology in which a false page member for detecting a page turning-over operation is disposed on a fixed display portion, page updating is limited to a certain number of the false page members and therefore another page updating method is required in case of page updating exceeding the certain number of the false page members.

SUMMARY OF THE INVENTION

It is an object of the present invention to provide an image displaying device capable of updating pages by operation similar to page turning-over operation of paper books without using an image updating method peculiar to a device.

It is another object of the present invention to provide an image displaying device capable of updating images regardless of the number of pages.

According to the first aspect of the present invention, an image displaying device, includes a first display portion capable of changing display contents and provided at a front surface side of a main body, a second display portion capable of changing display contents and provided at a back surface side of the main body, a detector which detects a turning-over of the main body, and a display controller capable of changing the display contents of the first or second display portion depending on a detected result of the detector.

With this image displaying device, in this image displaying device, when the main body is turned over from the state in which an image is displayed on the front surface side of the first or second display portion, the turning-over is detected by the detector and the display of the display portion which newly becomes a front surface is updated.

Accordingly, without performing any switching operation, it becomes possible to change the display contents by a simple turning-over operation of the main body similar to the turning-over operation of paper books. Furthermore, the number of page updating is not limited to the number of false pages to be operated.

According to the second aspect of the present invention, an image displaying device includes a plurality of sheet-like image displaying members having one or plural image display portions capable of changing display contents and bound each other so as to open and close each of the image display portions, a detector that detects whether each of the image display portions are opened or closed, and a display controller that changes display contents of one or plural certain image display portions depending on a detected result of the detector.

With this image displaying device, it is possible to change the display contents by opening/closing the image displaying member like turning over pages of paper books.

Other objects and the features will be apparent from the following detailed description of the present invention with reference to the attached drawings.

BRIEF DESCRIPTION OF THE DRAWINGS

The present invention will be more fully described and better understood from the following description, taken with the appended drawings, in which:

FIG. 7 is a table showing the state of the detection switches and the displayed pages of the displaying sides corresponding to the page turning-over operation;

FIG. 21 is a table showing the state of the detection switches and the displayed pages of the displaying sides corresponding to the page turning-over operation;

FIG. 29 is a table showing the state of the detection switches and the displayed pages of the displaying sides corresponding to the page turning-over operation;

DETAILED DESCRIPTION OF THE PREFERRED EMBODIMENTS

Figure 1:
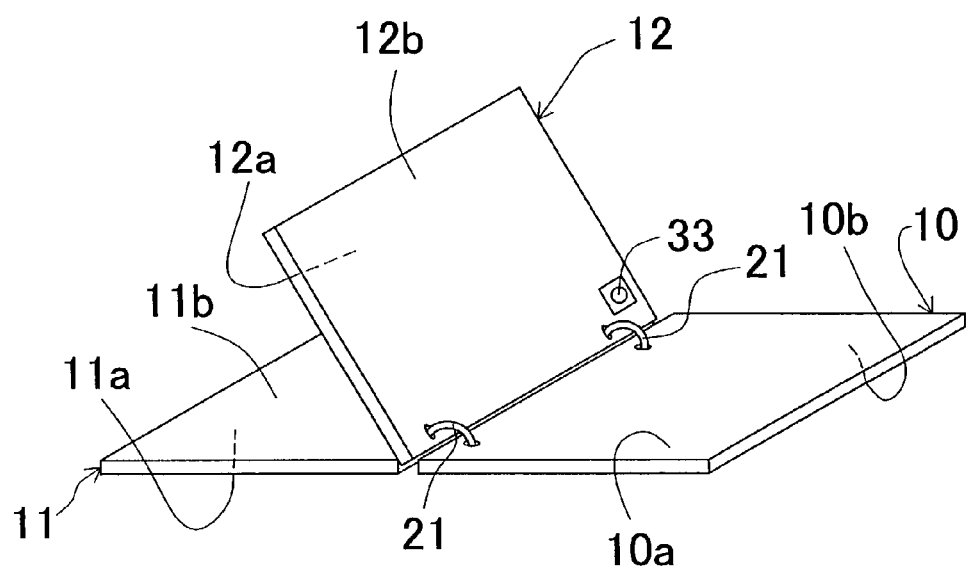
FIG. 1 is a perspective view showing an electronic book to which the image displaying device according to the first embodiment of the present invention.
Figure 2:
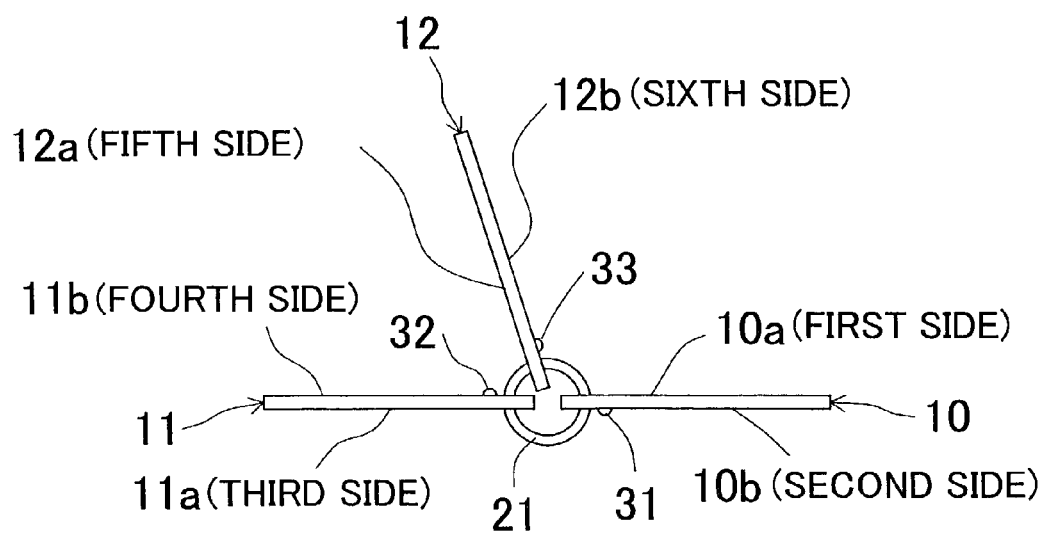
FIG. 2 is a front side view of the electronic book.

FIG. 1 is a perspective view showing an electronic book according to the first embodiment of the present invention. FIG. 2 is a front side view of the electronic book.

In FIGS. 1 and 2, the electronic book is provided with plural (e.g., three) sheet-like image displaying members 10, 11 and 12 each having two display sides, front and rear sides, and capable of changing the display contents, two binding portions 21 and 21 rotatably connecting these image displaying members 10, 11 and 12 and detection switches 31, 32 and 33 for detecting the opening/closing state of the display side of each image displaying member 10 to 12.

The binding portions 21 and 21 are ring-shaped portions holding each basal end portion of the image displaying members 10, 11 and 12 like paper books such that the image displaying members can be opened and closed. Needless to say, the form of this binding portion 21 can be changed arbitrarily.

The image displaying members 10 to 12 are comprised of, for example, a relatively thin sheet-like reflection type liquid crystal display, respectively. The image displaying member 10 has, at its both sides, the front side and the rear side. The image displaying member 10 is provided with a display surface 10a and 10b on the respective side. The image displaying member 11 is also provided with a display surface 11a and 11b on the respective side. Similarly, the image displaying member 12 is provided with a display surface 12a and 12b on the respective side.

Figure 4:
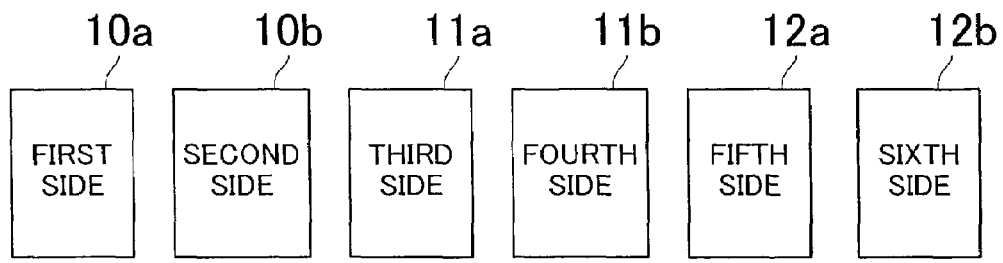
FIG. 4 shows displaying surfaces in a developed state.

As shown in FIG. 4, in this electronic book, the front surface side 10a of the first image displaying member 10 constitutes the first side, and the rear surface side 10b thereof constitutes the second side, the front surface side 11a of the second image displaying member 11 constitutes the third side, and the rear surface side 11b thereof constitutes the fourth side, and the front surface side 12a of the third image displaying member 12 constitutes the fifth side, and the rear surface side 12b thereof constitutes the sixth side.

On the display surface 10b of the image displaying member 10 or the display surface 11a of the image displaying member 11 (e.g., on the display surface 10b of the image displaying member 10), a detection switch 31 which will be turned on when both the image display portions 10 and 11 are disposed one on the other (near contacted state) is provided. Furthermore, on the display surface 11b of the image displaying member 11 or the display surface 12a of the image displaying member 12 (e.g., on the display surface 11b of the image displaying member 11), a detection switch 32 which will be turned on when both the image display portions 11 and 12 are disposed one on the other is provided. Similarly, on the display surface 12b of the image displaying member 12 or the display surface 10a of the image displaying member 10 (e.g., on the display surface 12b of the image displaying member 12), a detection switch 33 which will be turned on when both the image display portions 12 and 10 are disposed one on the other is provided.

These detection switches 31, 32 and 33 perform detection operation for detecting the open/close state of each display side 10a to 12b in accordance with the page turning-over operation of each image displaying members 10, 11 and 12.

These detection switches 31, 32 and 33 are not limited to the aforementioned mechanical switches, but may be any switches such as magnetic switches or optical switches capable of detecting page turning-over of the image displaying members 10 to 12.

The image displaying members 10, 11 and 12 are connected by flexible telecommunication cables (not shown), and therefore these image displaying members can exchange data therebetween. Needless to say, such data exchange among the image displaying portions 10, 11 and 12 may be performed by a radio communication portion in place of the aforementioned communication cables.

Figure 3:
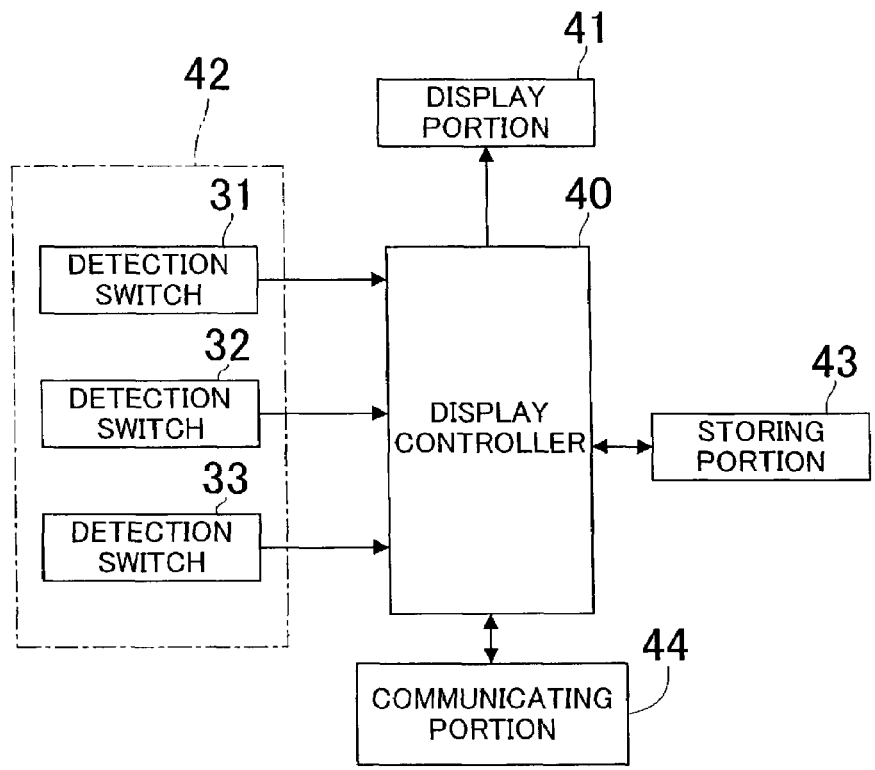
FIG. 3 is a block diagram showing the electric structure of the electronic book.

FIG. 3 is a block diagram showing the electric structure of the electronic book.

In FIG. 3, the electronic book is equipped with a display controller 40, a display portion 41, an input portion 42, a storing portion 43 and a communicating portion 44. The display controller 40, the storing portion 43 and the communicating portion 44 are built in the image displaying member 10, 11 or 12.

The aforementioned display portion 41 is equipped with the aforementioned six display surfaces, the display surfaces 10a and 10b, the display surfaces 11a and 11b and the display surfaces 12a and 12b, and displays the image data specified by the display controller 40.

In the storing portion 43, the display contents for every page is stored.

The input portion 42 is equipped with the detection switches 31, 32 and 33. For example, when the image displaying member 12 is turned over leftwards from the state shown in FIG. 2 and the display surface (fifth side) 12a of the image displaying member 12 contacts the display surface (fourth side) 11b of the image displaying member 11, the detection switch 32 is turned on, and the display surface (fifth side) 12a of the image displaying member 12 is closed. At the same time, the display surface (sixth side) 12b of the image displaying member 12 is opened.

The display controller 40 is equipped with a CPU, etc., and organically controls the entire electronic book. Furthermore, the display controller controls so as to change the display contents of certain display surfaces 10a to 12b upon the detection of the change of open/close state of each display surface of the image display portions 10, 11 and 12 by each detection switches 31, 32, and 33. In other words, in accordance with the change of the ON/OFF state of the detection switches 31, 32, and 33, an image data of a desired page is read out from the storing portion 43, and the image data is displayed on the display portion 41.

The aforementioned communicating portion 44 receives another image data from outside, and stores in the storing portion 43.

Next, in the electronic book having the aforementioned structure, the inputs of the input portion 42 and the transition of the displayed page on the six display surfaces according to the user operation will be explained with reference to FIGS. 5A to 6E.

In FIGS. 5A to 6E, the ON state of the detection switches 31 to 33 are shown in black. Furthermore, each display surface of the image displaying members 10 to 12 is shown as a displayed page number P.

<Page Forward Direction Updating>

Figure 5A:
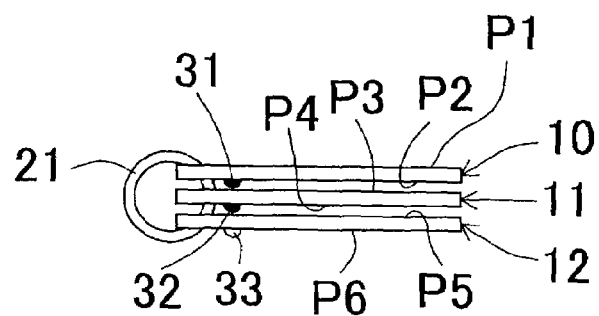
FIGS. 5A to 5I are explanatory drawings showing the page forward direction updating of the electronic book.

In the initial state in which the first side which is the display surface 10a of the image displaying member 10 faces up and the three image displaying members 10, 11 and 12 are closed as shown in FIG. 5A, the detection switches 31 and 32 are turned ON, and the detection switch 33 is turned OFF. At this time, the first side shows the first page (P1), the second side shows the second page (P2), the third side shows the third page (P3), the fourth side shows the fourth page (P4), the fifth side shows the fifth page (P5) and the sixth side shows the sixth page (P6).

Figure 5B:
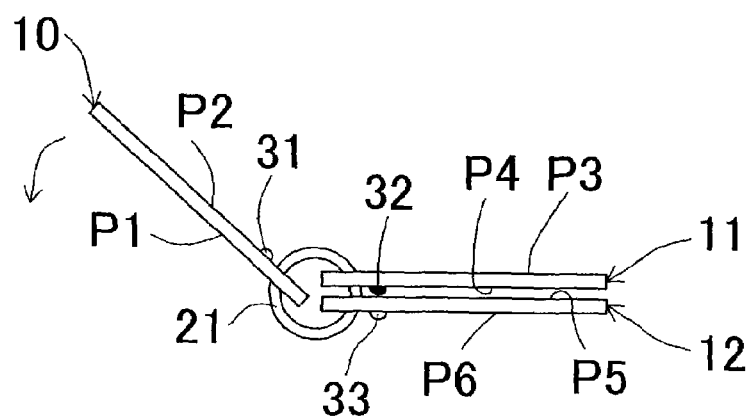

From this state, when the image displaying member 10 is turned over leftwards as shown in FIG. 5B as if a user turns over a page of a paper book (the first and second sides are located at the left side), the detection switch 31 detaches from the third side which is the display surface 1a of the image displaying member 11, thereby turning ON from the turned OFF state. At this time, it is not required to update the display contents.

Figure 5C:
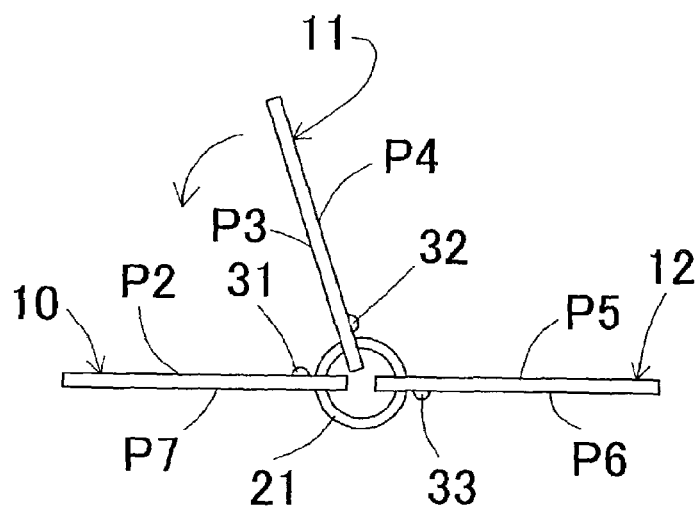
Figure 5D:
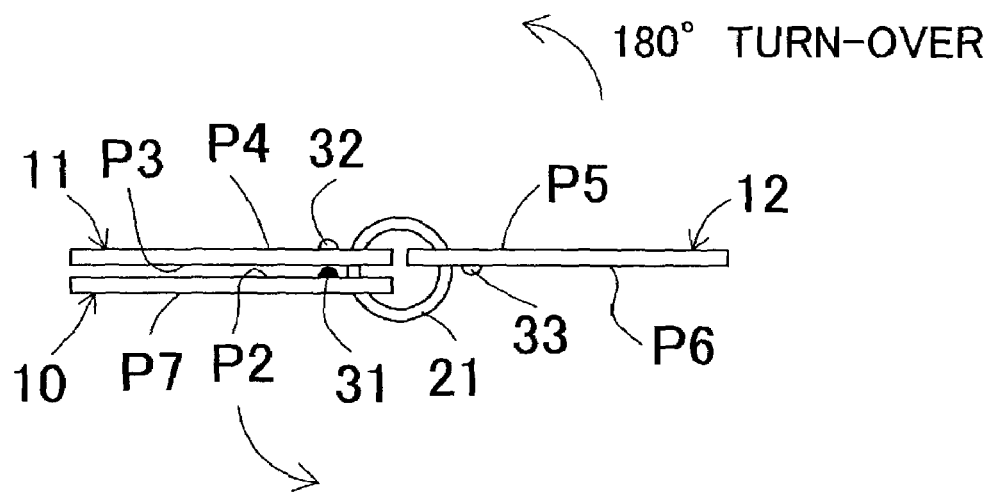

Subsequently, as shown in FIG. 5C, when the image displaying member 11 is turned over leftwards (third and fourth sides are located at the left side), the detection switch 32 is detached from the fifth side which is the display surface 12a of the image displaying member 12 to be turned OFF. In accordance with this operation, the seventh page image is displayed on the first side. When the image displaying member 11 completely comes down leftwards as shown in FIG. 5D, although the detection switch 31 is turned ON, it is not necessary to update the display contents.

Figure 5E:
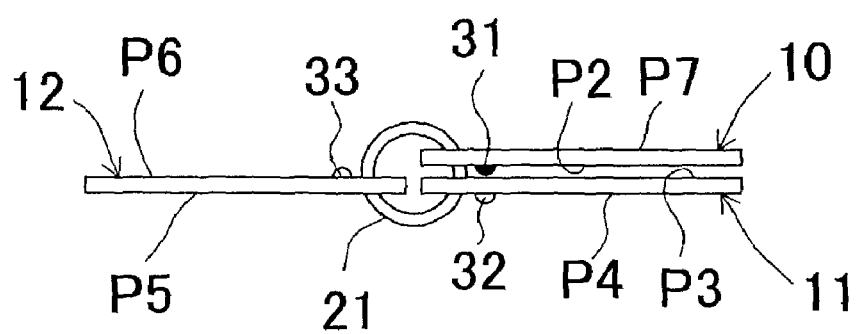

After the reading of the fifth page currently displayed on the display surface 12a of the image displaying member 12, when the entire device is turned over within the vertical plane about the binding portion 21 (180 degree rotation) and the sixth side and the first side are opened as shown in FIG. 5E (the fifth and sixth sides are located at the left side, and the first side is located at the right side), a seventh page image is displayed on the first side.

Figure 5F:
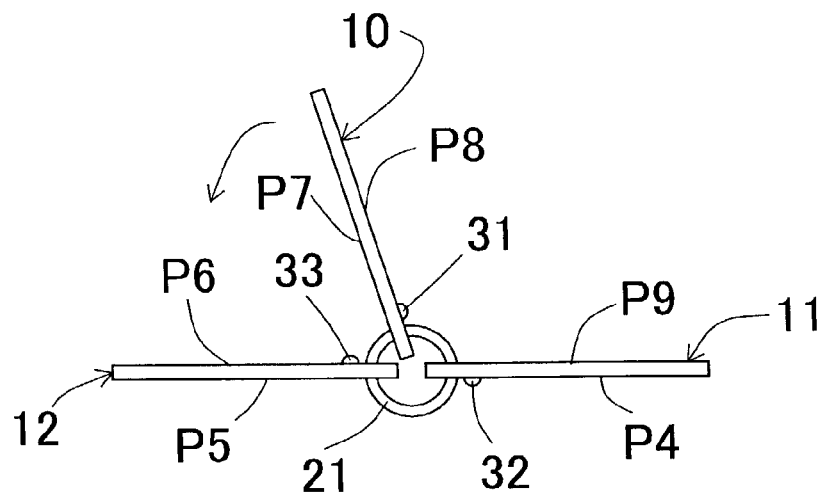

Then, when the image displaying member 10 is turned over leftwards as shown in FIG. 5F from the state shown in FIG. 5E, the turning OFF of the detection switch 31 accompanying the aforementioned operation is detected.

Figure 5G:
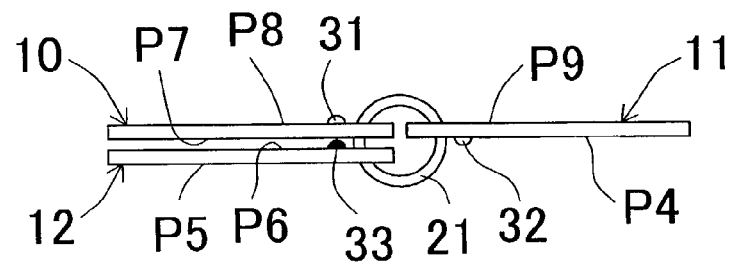

When the image displaying member 10 is opened leftwards, as shown in FIG. 5G, the eighth page image, is displayed on the second side and the ninth page image is displayed on the third side.

Figure 5H:
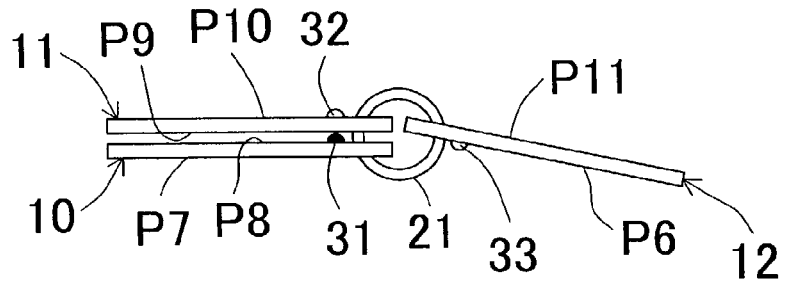
Figure 5I:
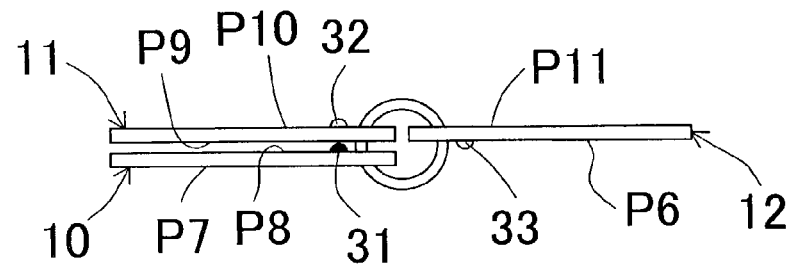

Subsequently, as shown in FIG. 5H, when the image displaying member 11 is turned over leftwards (third and fourth sides are located at the left side) and the image displaying member 12 is rotated rightwards, the detection switch 31 is turned ON and the detection switch 33 is turned OFF. As a result, the tenth page image is displayed on the fourth side and the eleventh page image is displayed on the fifth side. Then, as the image displaying member 12 is completely opened rightwards as shown in FIG. 5I from the state shown in FIG. 5H, the tenth and eleventh page images can be seen.

By repeating the aforementioned operation, updated images will be displayed on each display surface of the image displaying members 10, 11 and 12.

<Page Reverse Direction Updating>

Figure 6A:
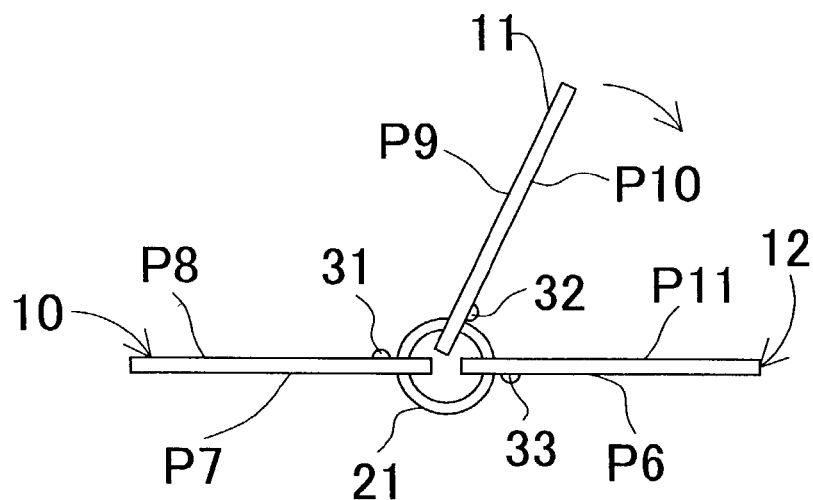
FIGS. 6A to 6E are explanatory drawings showing the page reverse direction updating of the electronic book.
Figure 6B:
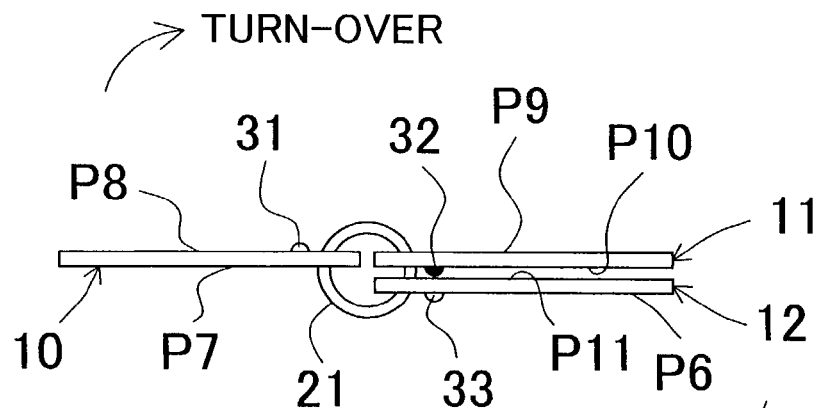
Figure 6C:
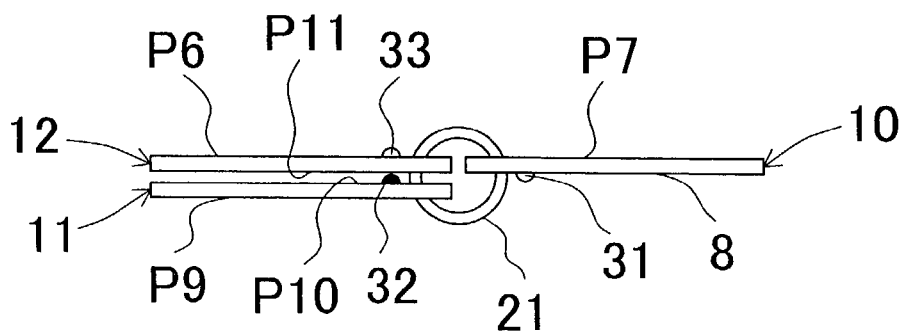

As shown in FIG. 6A, when the image displaying member 11 is turned over in a reverse direction (rightward direction), the detection switches 31 to 33 will be turned OFF, respectively. As the image displaying member 11 is completely opened rightwards as shown in FIG. 6B, the fourth side is closed and the detection switch 32 is turned ON. From this state, the entire device is are rotated by 180 degrees about the binding portion 21 so that the image displaying members 11 and 12 are located at the left side and the image displaying member 10 is located at the right side as shown in FIG. 6C.

Figure 6D:
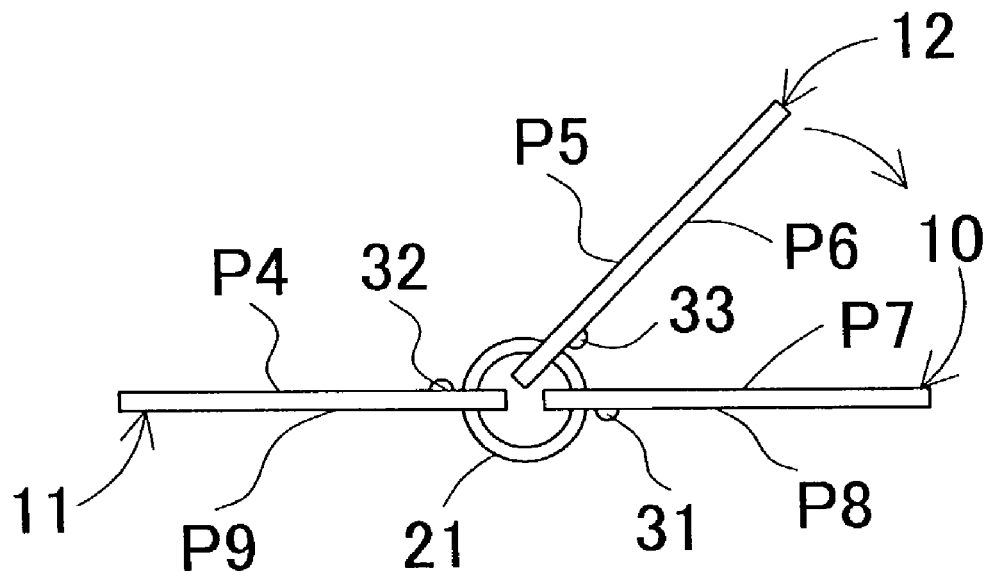
Figure 6E:
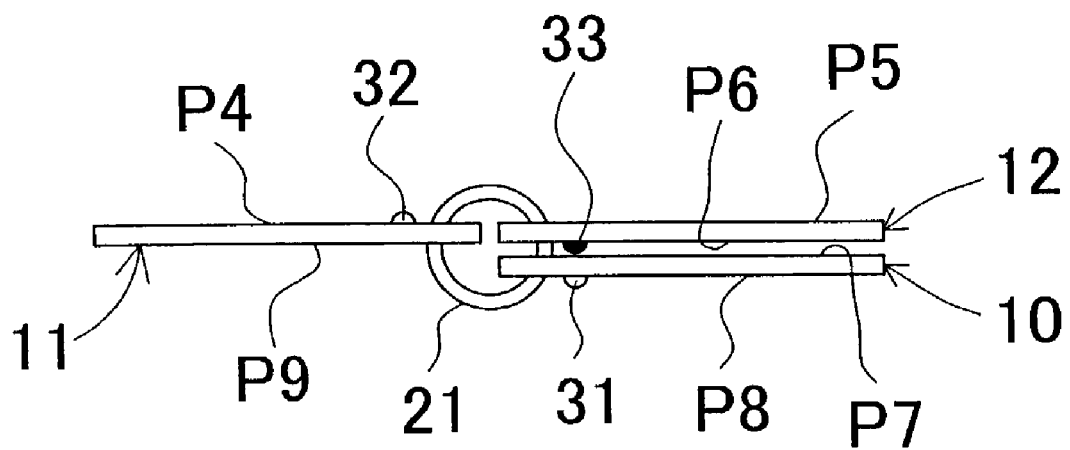

From this state, when the image displaying member 12 is turned over in the reverse direction (in the right direction) as shown in FIG. 6D, the detection switches 31 to 33 are turned OFF, and therefore the fourth and fifth page images are displayed on the display surfaces 4 and 5 of the image displaying members 11 and 12, respectively. When the image displaying member 12 is completely opened as shown in FIG. 6E, the detection switch 33 is turned ON. In this manner, page reverse updating (page returning) will be performed.

The page order, the input state in accordance with the updating in the page reverse direction and the displayed pages are collectively shown in the table of FIG. 7.

By the open/close operation of the image displaying members 10 to 12 like the page turning-over operation of paper books, the display contents can be changed easily without employing special structure.

Furthermore, the display contents of the image displaying members 10 to 12 judged to become a visible state can be changed by the detected result of the display contents of the current image displaying members 10 to 12 and the detection switches 31 to 33. Therefore, page updating can be performed in accordance with the opening/closing operation of the image displaying members 10 to 12.

Furthermore, since the aforementioned switches 31 to 33 are employed as a detecting means for detecting the page turning-over operation of the image displaying members 10 to 12, it is possible to easily and assuredly detect the completely opened state of the image displaying members 10 to 12 in accordance with the page opening operation.

Next, the contents of the display control processing by the display controller 40 will be explained with reference to the flowchart shown in FIG. 8.

In the following explanation and drawing, a step will be abbreviated as "S."

In S000, initial display processing is performed. Then, in S001, the time check for 10 ms which is a routine timer for inputting at a predetermined time interval is started.

Thereafter, in S002, input process from the input portion 42 is performed. In S003, required information is read out from the storing portion 43 and given to the display portion 41 to update the display. Subsequently, in S004, information is received from and/or transmitted to the outside via the communicating portion 44 if necessary. In S005, it is discriminated whether the predetermined time by the time check of the routine timer has passed. If the predetermined time has passed (YES in S005), the routine returns to S001 to start the time check by the timer again, and the input process from the input portion 42 is repeated. If the predetermined time has not passed (NO in S005), the routine waits until the time has passed.

Figure 9:
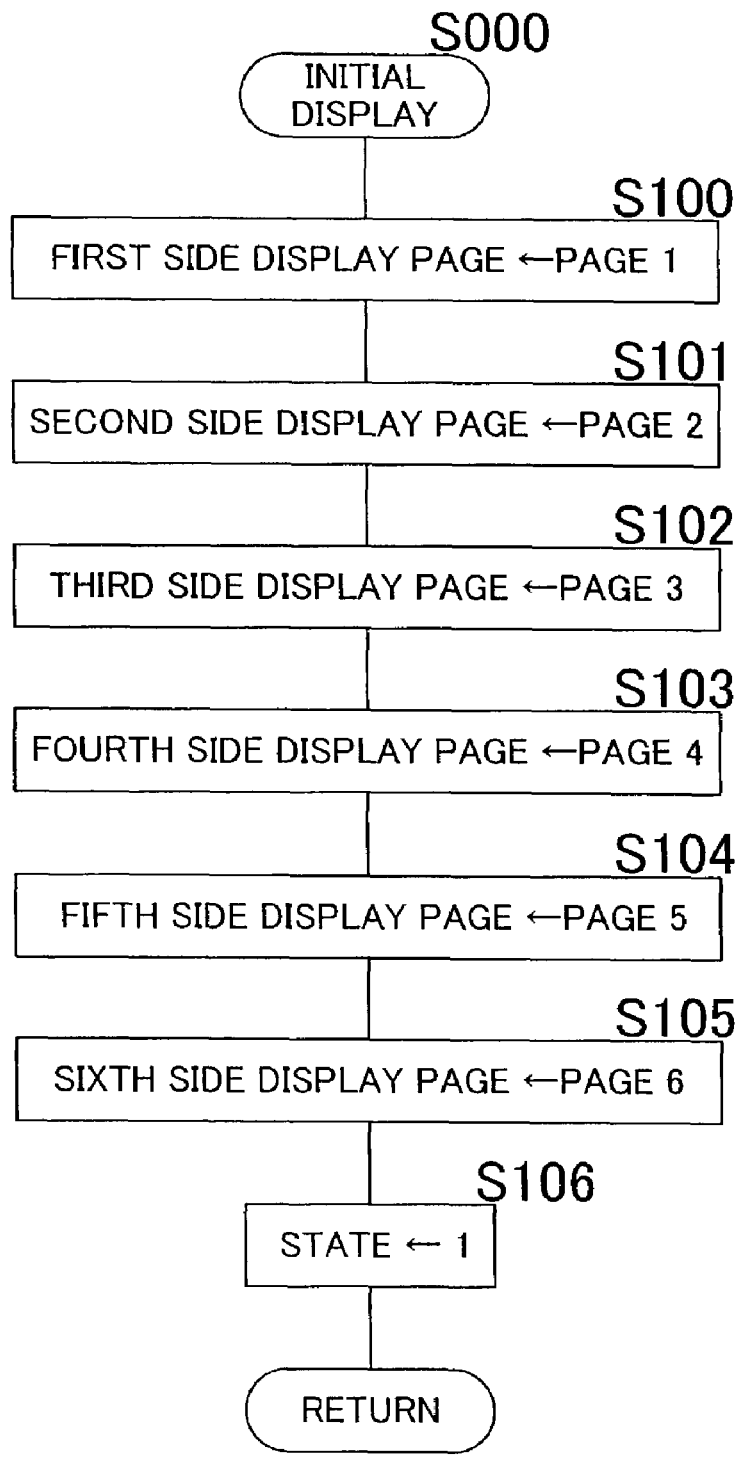
FIG. 9 is a flowchart showing the flow of processing for the initial display.

Next, the flow of initial display processing (S000) will be explained with reference to the flowchart shown FIG. 9.

First, in S100, the first page image is read out from the storing portion 43 and given to the first side of the display surface of the display portion 41. In S101, the second page image is read out from the storing portion 43 and given to the second side of the display surface of the display portion 41. In S102, the third page image is read out from the storing portion 43 and given to the third side of the display surface of the display portion 41.

In S103, the fourth page image is read out from the storing portion 43 and given to the fourth side of the display surface of the display portion 41. In S104, the fifth page image is read out from the storing portion 43 and given to the fifth side of the display surface of the display portion 41. In S105, the sixth page image is read out from the storing portion 43 and given to the sixth side of the display surface of the display portion 41. Thereafter, in S106, the variable State (hereinafter referred to as "St") used for the state judgment in the display update process (S003) is initialized to "1."

Figure 10:
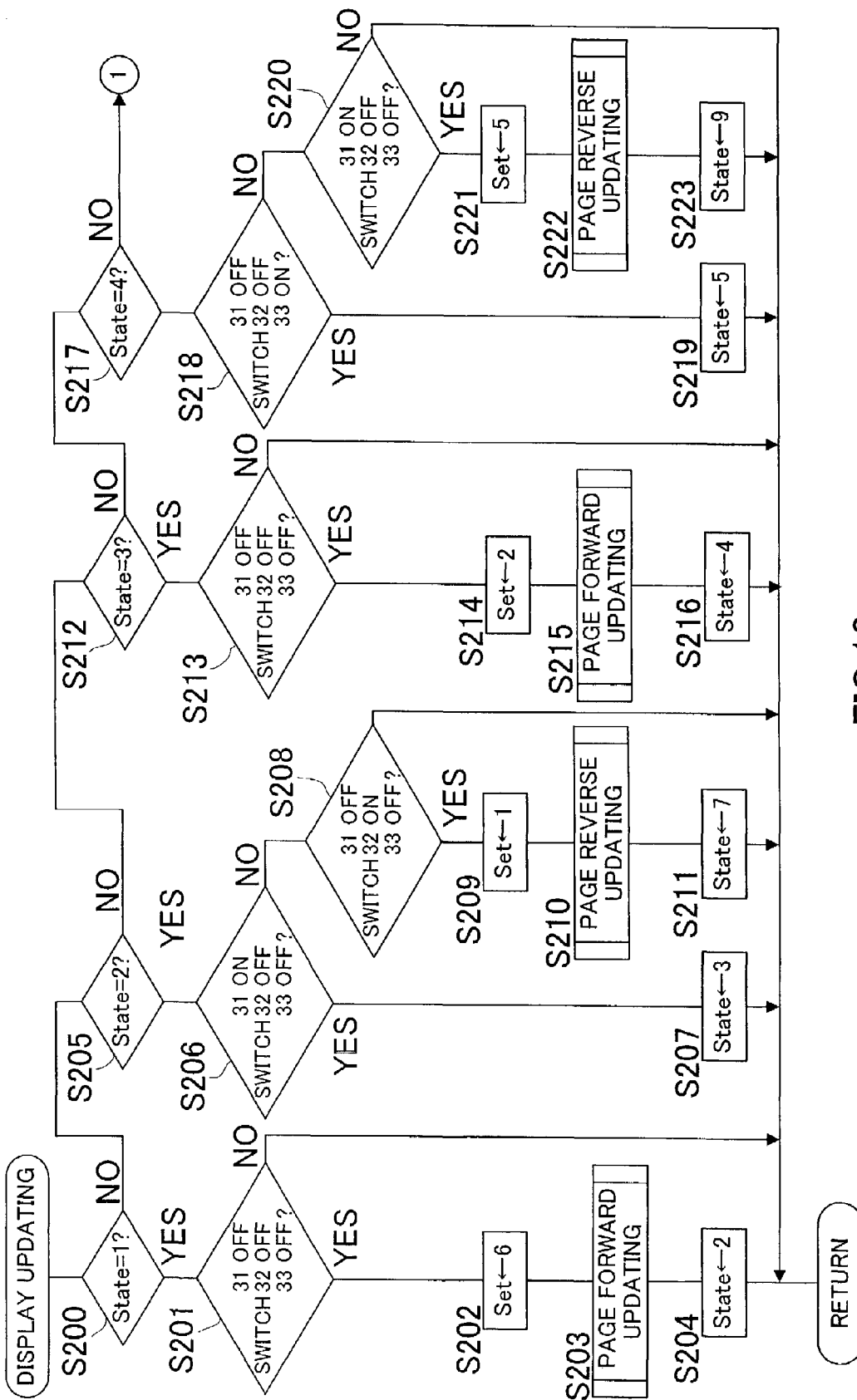
FIG. 10 is a flowchart showing the flow of the display updating process.

Next, the flow of the display update process (S003) will be explained with reference to the flowchart shown in FIGS. 10 to 12.

In S200, it is discriminated whether the state judgment variable St is "1." If the state judgment variable St is "1" (YES in S200), in S201, it is discriminated whether the detection switch 31 of the image displaying member 10 is turned OFF, the detection switch 32 of the image displaying member 11 is turned OFF and the detection switch 33 of the image displaying member 12 is turned OFF.

If these detection switches 31, 32 and 33 are turned OFF, respectively (YES in S201), in S202, the page designation variable Set is set to "6." Subsequently, in S203, the page forward update processing is performed, and in S204 the state judgment variable St is set to "2," and then the routine returns. If the detection switches 31, 32 and 33 are not turned OFF, respectively (NO in S201), the routine returns as it is.

In S200, if the state judgment variable St is not "1" (NO in S200), in S205, it is discriminated whether the state judgment variable St is "2." If the state judgment variable St is "2" (YES in S205). In S206, it is discriminated whether the detection switch 31 of the image displaying member 10 is turned ON, the detection switch 32 of the image displaying member 11 is turned OFF and the detection switch 33 of the image displaying member 12 is turned OFF. If these detection switches 31, 32 and 33 are turned ON, OFF and OFF respectively (YES in S206), in S207 the state judgment variable St is set to "3," and the routine returns.

If these detection switches 31, 32, and 33 are not turned ON, OFF and OFF, respectively (NO in S206), in S208, it is discriminated whether the detection switch 31 of the image displaying member 10 is turned OFF, the detection switch 32 of the image displaying member 11 is turned ON and the detection switch 33 of the image displaying member 12 is turned OFF. If these detection switches 31, 32 and 33 are turned OFF, ON and OFF, respectively (YES in S208), the page designation variable Set is set to "1" in S209. Subsequently, in S210, the page reverse update processing is performed, and in S211 the state judgment variable St is set to "7" and the routine returns.

In S208, if these detection switches 31, 32 and 33 are not turned OFF, ON and OFF, respectively (NO in S208), the routine returns as it is.

In S205, if the state judgment variable St is not "2" (NO in S205), in S212, it is discriminated whether the state judgment variable St is set to "3." If the state judgment variable St is "3" (YES in S212), in S213, it is discriminated whether the detection switch 31 of the image displaying member 10 is turned OFF, the detection switch 32 of the image displaying member 11 is turned OFF and the detection switch 33 of the image displaying member 12 is turned OFF. If these detection switches 31, 32 and 33 are OFF, OFF and OFF, respectively (YES in S213), after setting the page designation variable Set to "2" in S214, the page forward update processing is performed in S215. Then, the state judgment variable St is set to "4" in S216, and the routine returns.

In S213, if the detection switches 31, 32 and 33 are not OFF, OFF and OFF, respectively (NO in S213, the routine returns as it is.

If the state judgment variable St is not "3" in S212 (NO in S212), in S217, it is discriminated whether the state judgment variable St is "4." If the state judgment variable St is "4" (YES in S217), In S218, it is discriminated whether the detection switch 31 of the image displaying member 10 is turned OFF, the detection switch 32 of the image displaying member 11 is turned OFF and the detection switch 33 of the image displaying member 12 is turned ON. If these detection switches 31, 32 and 33 are turned OFF, OFF and ON, respectively (YES in S218), the state judgment variable St is set to "5" in S219, and the routine returns.

If these detection switches 31, 32 and 33 are not turned OFF, OFF and ON, respectively (NO in S218), in S220, it is discriminated whether the detection switch 31 of the image displaying member 10 is turned ON, the detection switch 32 of the image displaying member 11 is turned OFF and the detection switch 33 of the image displaying member 12 is turned OFF. If these detection switches 31, 32 and 33 are turned ON, OFF and OFF, respectively (YES in S220), the page designation variable Set is set to "5" in S221. Subsequently, after performing the page reverse update processing in S222, the state judgment variable St is set to "9" in S223, and then the routine returns. If the detection switches 31, 32 and 33 are not turned ON, OFF and OFF, respectively (NO in S220), the routine returns as it is.

Figure 11:
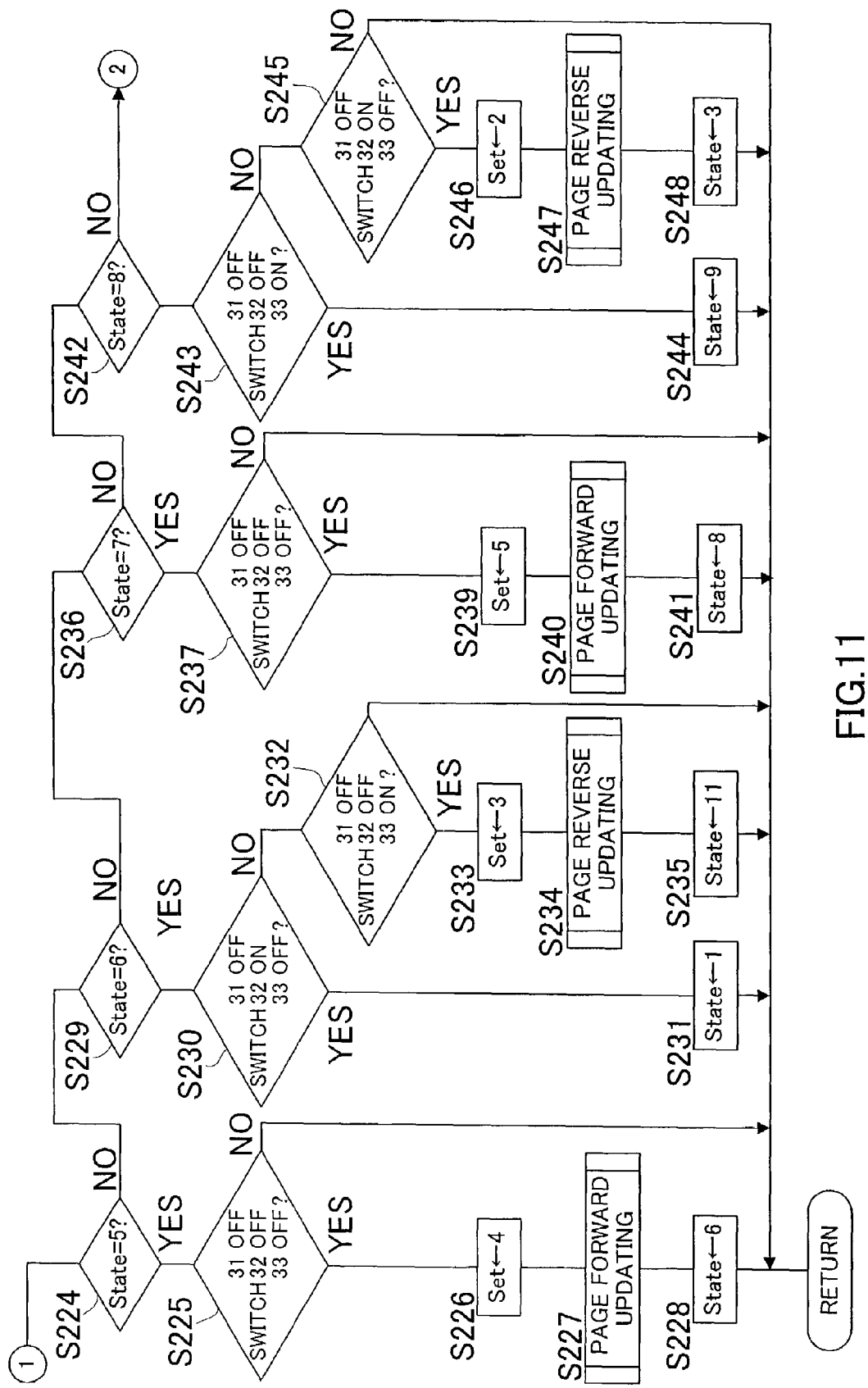
FIG. 11 is a flowchart showing the flow following FIG. 10.

In S217, if the state judgment variable St is not "4" (NO in S217), the routine proceeds to S224 in FIG. 11.

In FIG. 11, it is discriminated whether the state judgment variable St is "5" in S224. If the state judgment variable St is "5" (YES in S224), it is discriminated whether the detection switch 31 of the image displaying member 10 is turned OFF, the detection switch 32 of the image displaying member 11 is turned OFF and the detection switch 33 of the image displaying member 12 is turned OFF. If these detection switches 31, 32 and 33 are turned OFF, OFF and OFF, respectively (YES in S225), the page designation variable Set is set to "4" in S226. Subsequently, after performing the page forward update processing in S227, the state judgment variable St is set to "6" in S228, and the routine returns. If the detection switches 31, 32 and 33 are not turned OFF, OFF and OFF, respectively (NO in S225), the routine returns as it is.

In S224, if the state judgment variable St is not "5" (NO in S224), it is discriminated whether the state judgment variable St is "6" in S229. If the state judgment variable St is "6" (YES in S229), it is discriminated whether the detection switch 31 of the image displaying member 10 is turned OFF, the detection switch 32 of the image displaying member 11 is turned ON and the detection switch 33 of the image displaying member 12 is turned OFF. If these detection switches 31, 32 and 33 are turned OFF, ON, and OFF, respectively (YES in S230), the state judgment variable St is set to "1" in S231, and the routine returns.

In S230, if the detection switches 31, 32 and 33 are not turned OFF, ON and OFF, respectively (NO in S230), in S232, it is discriminated whether the detection switch 31 of the image displaying member 10 is turned OFF, the detection switch 32 of the image displaying member 11 is turned OFF and the detection switch 33 of the image displaying member 12 is turned ON. If these detection switches 31, 32 and 33 are turned OFF, OFF and ON, respectively (YES in S232), the page designation variable Set is set to "3" in S233. Subsequently, after performing the page reverse update processing in S234, the state judgment variable St is set to "11" in S235, and the routine returns. If the detection switches 31, 32 and 33 are not turned OFF, OFF and ON, respectively (NO in S232), the routine returns as it is.

In S229, if the state judgment variable St is not "6" (NO in S229), it is discriminated whether the state judgment variable St is "7" in S236.

If the state judgment variable St is "7" (YES in S236), in 237, it is discriminated whether the detection switch 31 of the image displaying member 10 is turned OFF, the detection switch 32 of the image displaying member 11 is turned OFF and the detection switch 33 of the image displaying member 12 is turned OFF. If these detection switches 31, 32 and 33 are turned OFF, OFF and OFF, respectively (YES in S237), the page designation variable Set is set to "5" in S239. Subsequently, after performing the page reverse update processing in S240, the state judgment variable St is set to "8" in S241, and the routine returns. If the detection switches 31, 32 and 33 are not turned OFF, OFF and OFF, respectively (NO in S237), the routine returns as it is.

In S236, if the state judgment variable St is not "7" (NO in S236), it is discriminated whether the state judgment variable St is "8" in S242.

If the state judgment variable St is 8 (YES in S242), in 243, it is discriminated whether the detection switch 31 of the image displaying member 10 is turned OFF, the detection switch 32 of the image displaying member 11 is turned OFF and the detection switch 33 of the image displaying member 12 is turned ON. If these detection switches 31, 32 and 33 are turned OFF, OFF and ON, respectively (YES in S243), the state judgment variable St is set to "9" in S244, and the routine returns.

In S243, if the detection switches 31, 32 and 33 are turned not OFF, OFF and ON, respectively (NO in S243), it is discriminated whether the detection switch 31 of the image displaying member 10 is OFF, the detection switch 32 of the image displaying member 11 is turned ON and the detection switch 33 of the image displaying member 12 is turned OFF. If these detection switches 31, 32 and 33 are turned OFF, ON and OFF, respectively (YES in S245), the page designation variable Set is set to "2" in S246. Subsequently, the page forward update processing is performed in S247, and the state judgment variable St is set to "3" in S248, and the routine returns. If the detection switches 31, 32 and 33 are not turned OFF, ON and OFF, respectively (NO in S245), the routine returns as it is.

Figure 12:
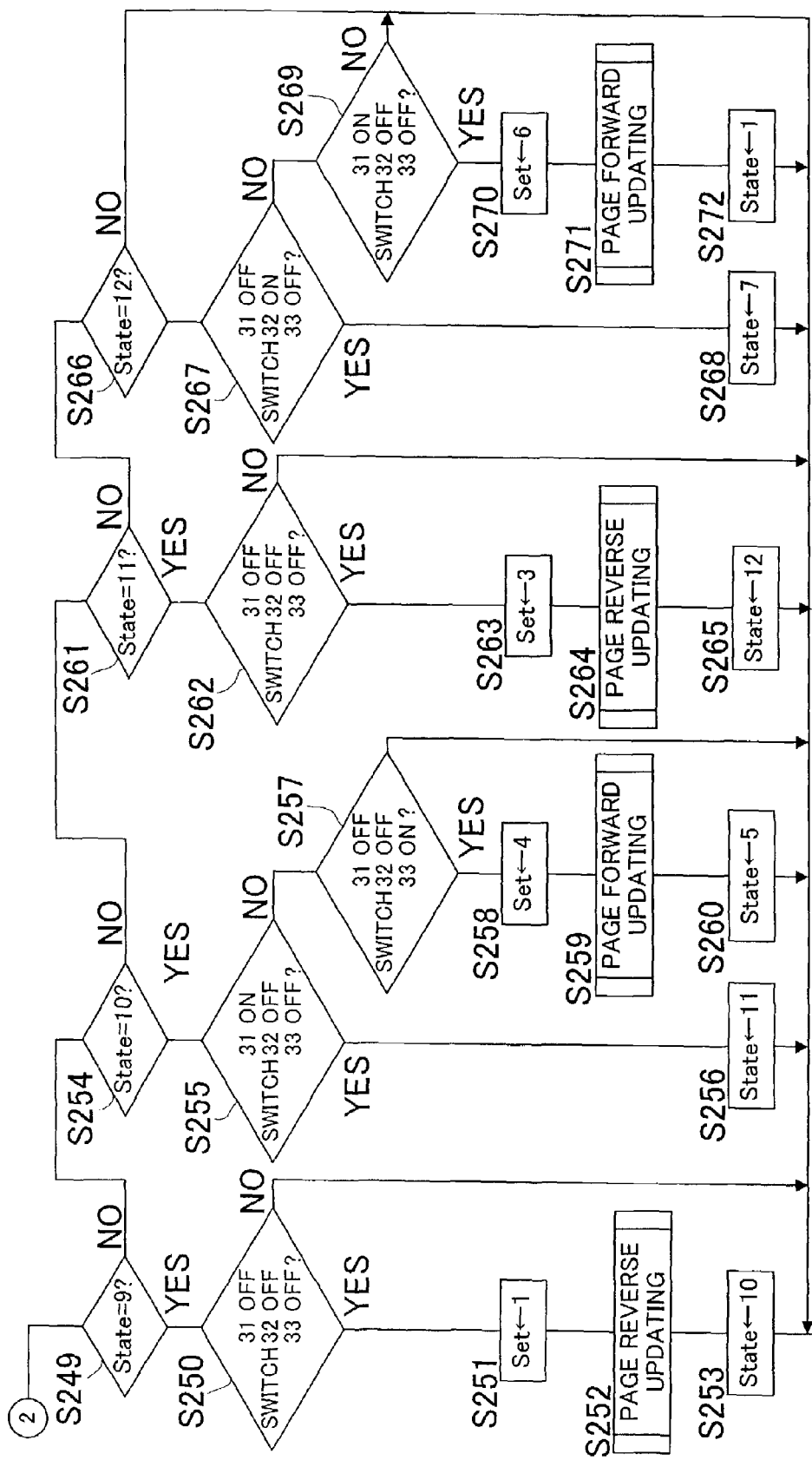
FIG. 12 is a flowchart showing the flow following FIG. 11.

In S242, if the state judgment variable St is not "8" (NO in S242), the routine proceeds to S249 in FIG. 12.

In FIG. 12, in S249, it is discriminated whether the state judgment variable St is "9." If the state judgment variable St is "9" (YES in S249), in 250, it is discriminated whether the detection switch 31 of the image displaying member 10 is turned OFF, the detection switch 32 of the image displaying member 11 is turned OFF and the detection switch 33 of the image displaying member 12 is turned OFF. If these detection switches 31, 32 and 33 are turned OFF, OFF and OFF, respectively (YES in S250), the page designation variable Set is set to "1" in S251. Subsequently, after performing the page reverse update processing in S252, the state judgment variable St is set "10" in S253, and the routine returns.

In S250, if these detection switches 31, 32 and 33 are not turned OFF, OFF and OFF, respectively (NO in S250), the routine returns as it is.

In S249, if the state judgment variable St is not "9" (NO in S249), in 254, it is discriminated whether the state judgment variable St is "10." If the state judgment variable St is "10" (YES in S254), in 255, it is discriminated whether the detection switch 31 of the image displaying member 10 is turned ON, the detection switch 32 of the image displaying member 11 is turned OFF and the detection switch 33 of the image displaying member 12 is turned OFF. If these detection switches 31, 32 and 33 are turned ON, OFF and OFF, respectively (YES in S255), the state judgment variable St is set "11" in S256, and the routine returns.

In S255, if the detection switches 31, 32 and 33 are not turned ON, OFF and OFF, respectively (NO in S255), it is discriminated whether the detection switch 31 of the image displaying member 10 is turned OFF, the detection switch 32 of the image displaying member 11 is turned OFF and the detection switch 33 of the image displaying member 12 is turned ON. If these detection switches 31, 32 and 33 are turned OFF, OFF and ON, respectively (YES in S257), the page designation variable Set is set to "4" in S258. Subsequently, after performing the page forward update processing in S259, the state judgment variable St is set "5" in S260, and the routine returns. If the detection switches 31, 32 and 33 are not turned OFF, OFF and ON, respectively (NO in S257), the routine returns as it is.

In S254, if the state judgment variable St is not "10" (NO in S254), in S261, it is discriminated whether the state judgment variable is "11."

If the state judgment variable St is "11" (YES in S261), in S262, it is discriminated whether the detection switch 31 of the image displaying member 10 is turned OFF, the detection switch 32 of the image displaying member 11 is turned OFF and the detection switch 33 of the image displaying member 12 is turned OFF. If these detection switches 31, 32 and 33 are turned OFF, OFF and OFF, respectively (YES in S262), the page designation variable Set is set to "3" in S263. Subsequently, after performing the page reverse update processing in S264, the state judgment variable St is set to "12" in S265, and the routine returns. If the detection switches 31, 32 and 33 are not turned OFF, OFF and OFF, respectively (NO in S262), the routine returns as it is.

In S261, if the state judgment variable St is not "11" (NO in S261), in S266, it is discriminated whether the state judgment variable is "12."

If the state judgment variable St is "12" (YES in S266), in 267, it is discriminated whether the detection switch 31 of the image displaying member 10 is turned OFF, the detection switch 32 of the image displaying member 11 is turned ON and the detection switch 33 of the image displaying member 12 is turned OFF. If these detection switches 31, 32 and 33 are turned OFF, ON and OFF, respectively (YES in S267), the state judgment variable St is set to "7" in S268, and the routine returns.

In S267, if the detection switches 31, 32 and 33 are not turned OFF, ON and OFF, respectively (NO in S267), in 269, it is discriminated whether the detection switch 31 of the image displaying member 10 is turned ON, the detection switch 32 of the image displaying member 11 is turned OFF and the detection switch 33 of the image displaying member 12 is turned OFF. If these detection switches 31, 32 and 33 are turned ON, OFF and OFF, respectively (YES in S269), the page designation variable Set is set to "6" in S270. Subsequently, in S271, the page forward update processing is performed, and the state judgment variable St is set to "1" in S272, and the routine returns. If the detection switches 31, 32 and 33 are not turned ON, OFF and OFF, respectively (NO in S269), the routine returns as it is.

In S266, if the state judgment variable St is not "12" (NO in S266), the routine returns as it is.

Figure 13:
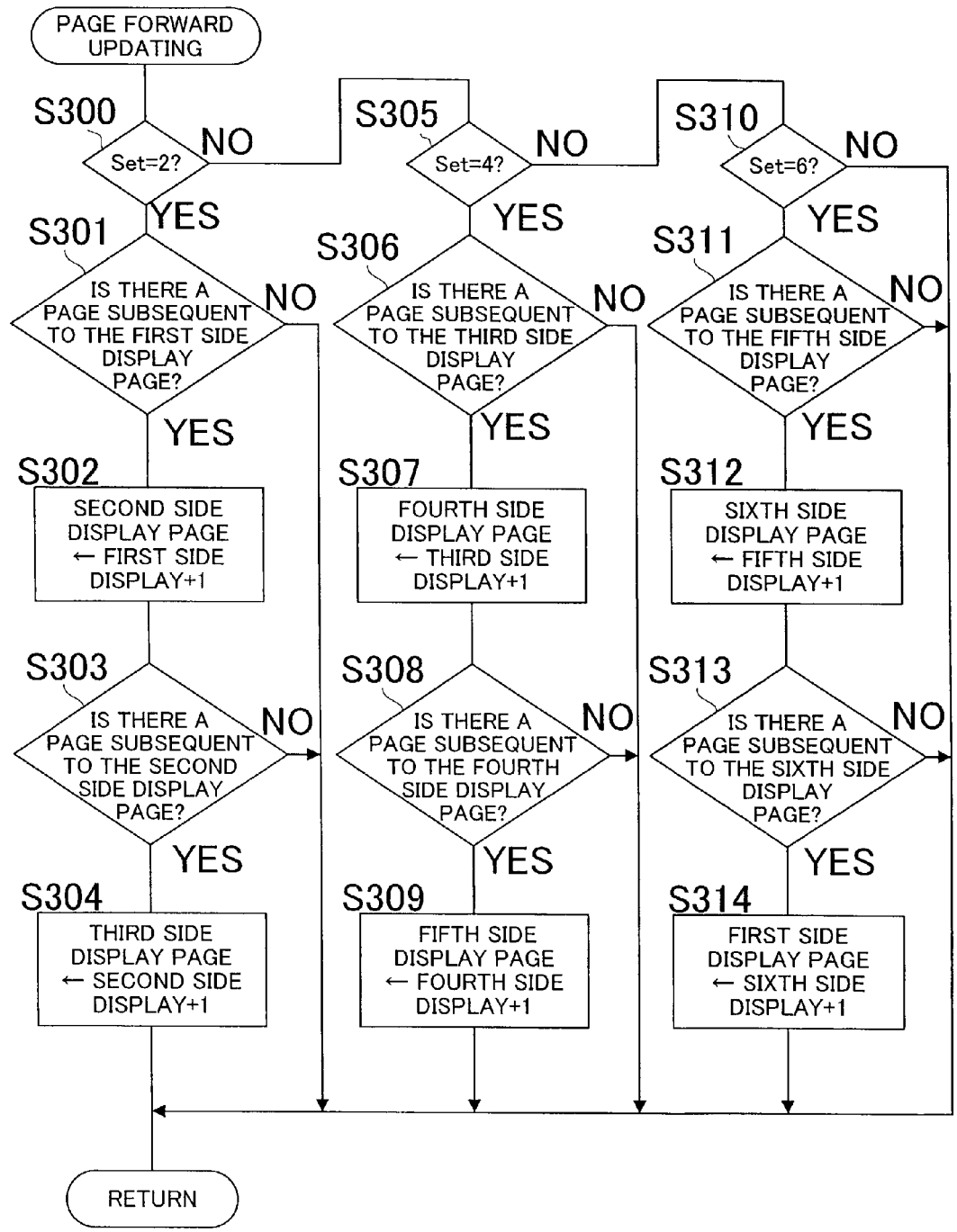
FIG. 13 is a flowchart showing the flow of page forward updating processing.

Next, the flow of the page forward update processing (S203, etc.) will be explained with reference to the flowchart shown in FIG. 13.

It is discriminated whether the next page exists depending on the page designation variable Set set immediately before reading, and forward updating of two opened pages is performed.

First, it is discriminated whether the page designation variable Set is "2" in S300. If the page designation variable Set is not "2" (NO in S300), the routine proceeds to S305.

If the page designation variable Set is "2" (YES in S300), in S301, it is discriminated whether there is a next page subsequent to the first side displayed page. If there is the next page subsequent to the first side displayed page (YES in S301, the next page subsequent to the first side displayed page is displayed on the second side displayed page in S302. If there is no next page subsequent to the first side displayed page (NO in S301), the routine returns as it is.

Subsequently, in S303, it is discriminated whether there is a next page subsequent to the second side displayed page. If there is a next page subsequent to the second side displayed page (YES in S303), the next page subsequent to the second side displayed page is displayed on the third page displayed page in S304. If there is no next page subsequent to the second side displayed page (NO in S303), the routine returns as it is.

In S305, it is discriminated whether the page designation variable Set is "4." If the page designation variable Set is not "4" (NO in S305), the routine proceeds to S310.

If the page designation variable Set is "4" (YES in S305), it is discriminated whether there is a next page subsequent to the third side displayed page in S306. If there is a next page subsequent to the third side displayed page (YES in S306), the next page subsequent to the third side displayed page is displayed on the fourth side displayed page in S307. If there is a next page subsequent to the third side displayed page (NO in S306), the routine returns as it is.

Subsequently, in S308, it is discriminated whether there is a next page subsequent to the fourth side displayed page. If there is a next page subsequent to the fourth side displayed page (YES in S308), the next page subsequent to the fourth side displayed page is displayed on the fifth side displayed page in S309. If there is no next page subsequent to the fourth side displayed page (NO in S308), the routine returns as it is.

In S310, it is discriminated whether the page designation variable Set is "6." If the page designation variable Set is not "6" (NO in S310), the routine returns as it is.

If the page designation variable Set is "6" (YES in S310), it is discriminated whether there is a next page subsequent to the fifth side displayed page in S311. If there is a next page subsequent to the fifth side displayed page (YES in S311), the next page subsequent to the fifth side displayed page is displayed on the sixth side displayed page in S312. If there is no next page subsequent to the fifth side displayed page (NO in S311), the routine returns as it is.

Subsequently, in S313, it is discriminated whether there is a next page subsequent to the sixth side displayed page. If there is a next page subsequent to the sixth side displayed page (YES in S313), in S314, the next page subsequent to the sixth side displayed page is displayed on the first side displayed page. If there is no next page subsequent to the sixth side displayed page (NO in S313), the routine returns as it is.

Figure 14:
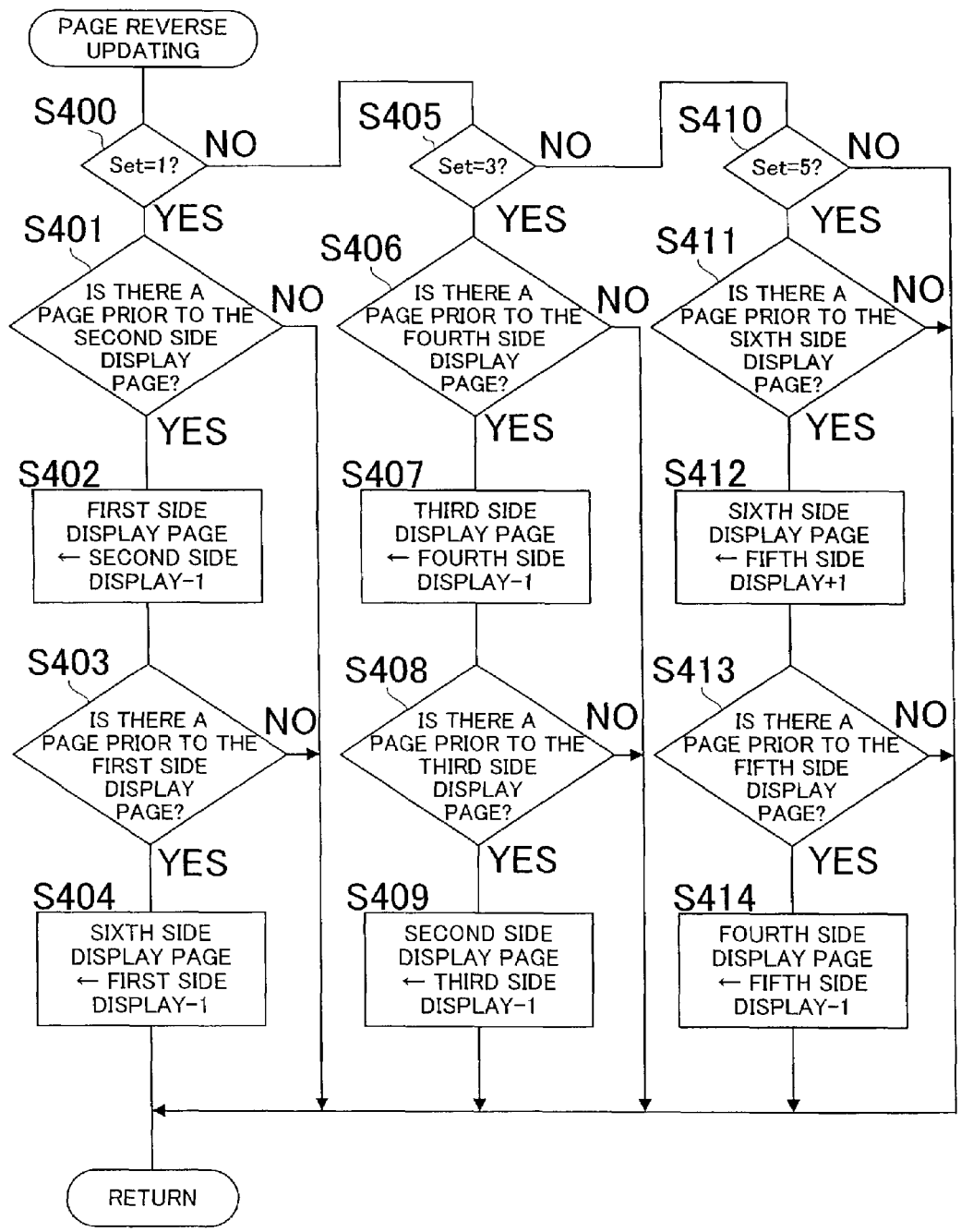
FIG. 14 is a flowchart showing the flow of page reverse updating processing.

Next, the flow of page reverse update processing (S210, etc.) will be explained with reference to FIG. 14.

Similar to the page forward update processing, it is discriminated whether the next page exists depending on the page designation variable Set set immediately before reading, and forward updating of two opened pages is performed.

In S400, it is discriminated whether the page designation variable Set is "1." If the page designation variable Set is not "1" (NO in S400), the routine proceeds to S405.

If the page designation variable Set is "1" (YES in S400), in S401, it is discriminated whether there is a preceding page of the second side displayed page. If there is a preceding page of the second side displayed page (YES in S401), the preceding page of the second side displayed page is displayed on the first side displayed page in S402. If there is no preceding page of the second side displayed page (NO in S401), the routine returns as it is.

Subsequently, in S403, it is discriminated whether there is a preceding page of the first side displayed page. If there is a preceding page of the first side displayed page (YES in S403), the preceding page of the first side displayed page is displayed on the sixth side displayed page in S404. If there is no preceding page of the first side displayed page (YES in S403), the routine returns as it is.

In S405, it is discriminated whether the page designation variable Set is "3." If the page designation variable Set is not "3" (NO in S405), the routine proceeds to S410.

If the page designation variable Set is "3" (YES in S405), it is discriminated whether there is a preceding page of the fourth side displayed page in S406. If there is a preceding page of the fourth side displayed page (YES in S406), the preceding page of the fourth side displayed page is displayed on the third side displayed page in S407. If there is no preceding page of the fourth side displayed page (NO in S406), the routine returns as it is.

Subsequently, in S408, it is discriminated whether there is a preceding page of the third side displayed page. If there is a preceding page of the third side displayed page (YES in S408), the preceding page of the third side displayed page is displayed on the second side displayed page in S409. If there is no preceding page of the third side displayed page (NO in S408), the routine returns as it is.

In S410, it is discriminated whether the page designation variable Set is "5." If the page designation variable Set is not "5" (NO in S410), the routine returns as it is.

If the page designation variable Set is "5" (YES in S410), in S411, it is discriminated whether there is a preceding page of the sixth side displayed page. If there is a preceding page of the sixth side displayed page (YES in S411), the preceding page of the sixth side displayed page is displayed on the fifth side displayed page in S412. If there is no preceding page of the sixth side displayed page (NO in S411), the routine returns as it is.

Subsequently, if it is discriminated whether there is a preceding page of the fifth side displayed page. If there is a preceding page of the fifth side displayed page (YES in S413), in S414, the preceding page of the fifth side displayed page is displayed on the fourth side displayed page. If there is no preceding page of the fifth side displayed page (NO in S413), the routine returns as it is.

Next, the second embodiment of the present invention will be explained with reference to the drawings.

Figure 15:
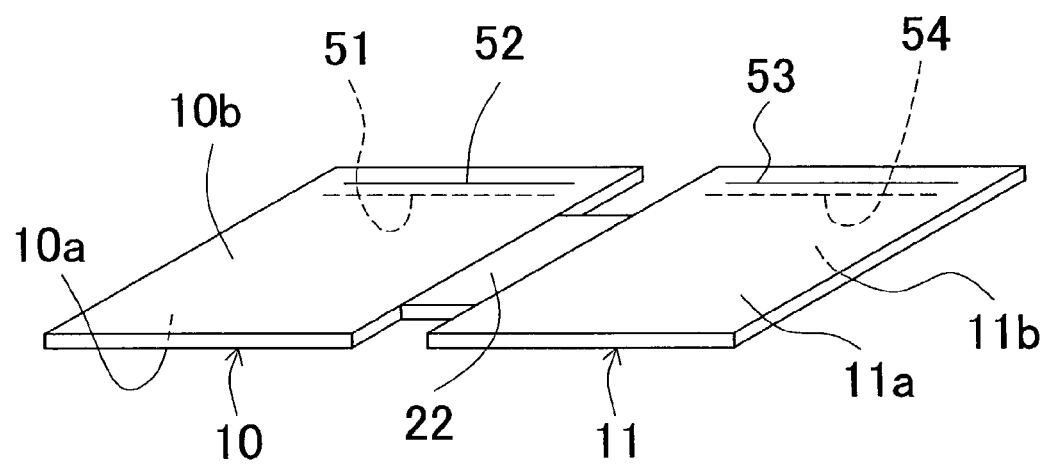
FIG. 15 is a perspective view showing an electronic book to which an image displaying device according to the second embodiment of the present invention.
Figure 16:
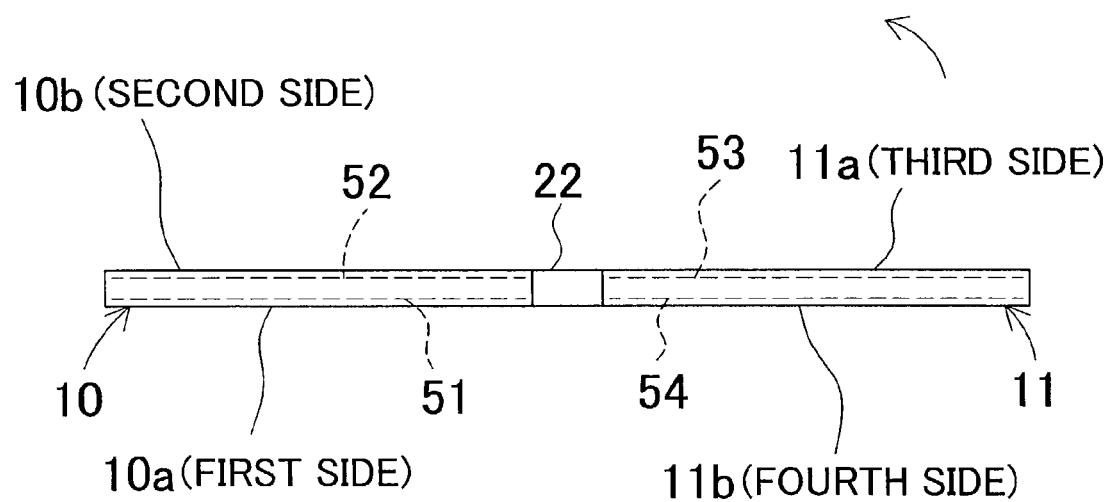
FIG. 16 is a front side view showing the electronic book.

FIG. 15 is a perspective view showing the electronic book according to the second embodiment of the present invention, and FIG. 16 is a front side view thereof.

In FIGS. 15 and 16, a plurality of (e.g., two) sheet-like image displaying members 10, 11 capable of changing the display contents are integrally connected with each other by a flexible joint portion 22 at the adjacent end portions thereof.

Figure 18:
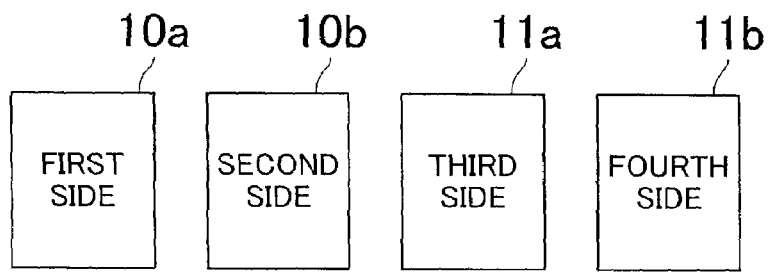
FIG. 18 shows displaying surfaces in a developed state.

The whole image displaying members 10, 11 are capable of deforing curvedly to a page forward direction, having, at front and rear sides, extra thin display surfaces 10a, 10b, 11a and 11b comprised of a selfemmission element such as an EL element respectively. The display surfaces 10a, 10b, 11a, 11b are comprised of a selfemmission element such as EL element. In other words, the front surface side display surface 10a of the first image displaying member 10 constitutes a first side and the rear surface side display surface 10b constitutes a second side. The front surface side display surface 11a of the first image displaying member 11 constitutes a third side and the rear surface side display surface 11b constitutes a fourth side (see FIG. 18).

The flexible joint portion 22 connects both the image displaying members 10 and 11 so that the image displaying members can be folded in two in order to enable the page forward updating or page reverse updating of the display surfaces 10a, lob, 11a and 11b of the image displaying members 10 and 11.

On the display surfaces 10a and 10b and the display surfaces 11a and 11b, in order to detect the opening and closing of the image displaying members 10 and 11 from the curve deformation thereof, a string-shaped strain gauge such as a piezoelectric device (hereinafter referred to as "detection element") 51 and 52, 53 and 54 are provided, respectively.

In the detection elements 51 to 54, in the state where the right end of the image displaying member 11 is raised, the detecting element 54 of the fourth side which is the display surface 11b of the lower surface of the image displaying member 11 is deformed so as to increase the length, and the output becomes ON.

Figure 17:
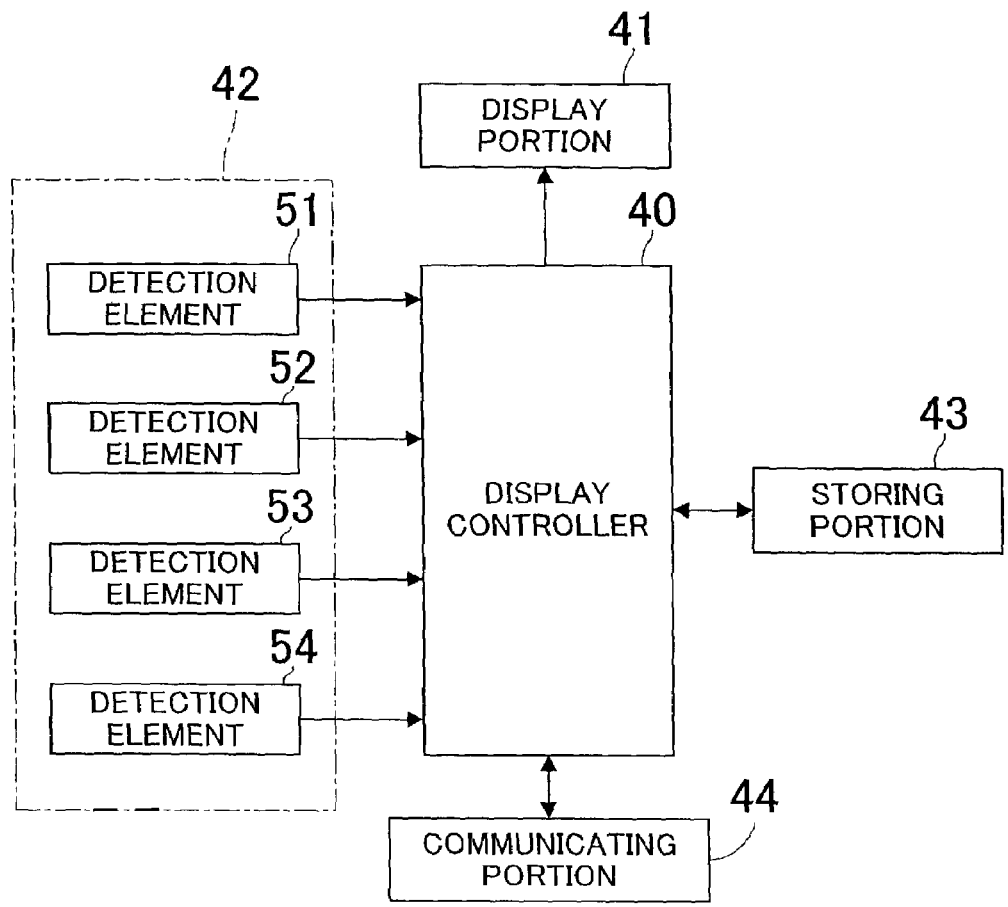
FIG. 17 is a block diagram showing the electric structure of the electronic book.

FIG. 17 is a block diagram showing the electric structure of the electronic book according to this second embodiment. In FIG. 17, the same reference numerals are allotted to the same portions as in the electric structure of the first embodiment, and the explanation will be omitted. In this embodiment too, a display controller 40, a storing portion 43 and a communicating portion 44 are built in an image displaying member 10 or 11.

In FIG. 17, the input portion 42 is equipped with the aforementioned detection elements 51 to 54. The display controller 40 reads out an image data of a predetermined page from the storing portion 43 depending on the detected result of the input portion 42, i.e., the deformed (ON state) detection element among the detection elements 51 to 54 and gives the image data to the display portion 41.

Next, regarding the electronic book according to the second embodiment, the input situations of the input portion 42 and the transitions of the display images of four display surfaces in accordance with the user operations will be explained with reference to the FIGS. 19A to 20H.

In FIGS. 19A to 20H, the ON states of the detection elements 51 to 54 is are shown by solid lines, and the OFF states by dotted lines. Furthermore, the display surfaces of the image displaying members 10 and 11 are shown by the display pages.

<Page Forward Direction Updating>

Figure 19A:
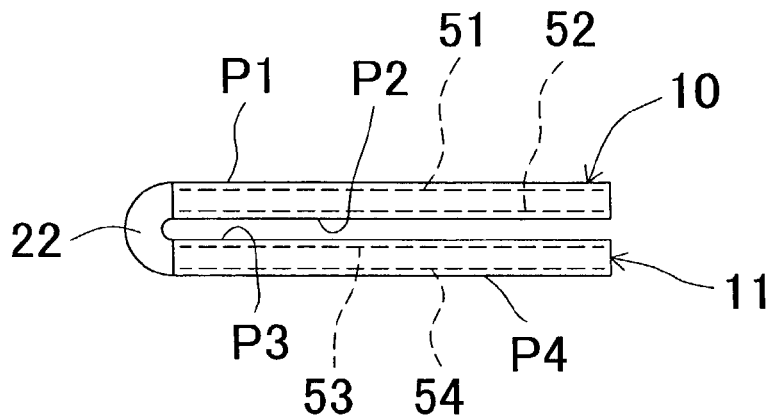
FIGS. 19A to 19I are explanatory drawings showing the page forward direction updating of the electronic book.

In FIG. 19, as shown in FIG. 19A, in the initial state in which the first side which is a display surface 10a of the image displaying member 10 faces up and both the image displaying members 10 and 11 are folded in two, the detection elements 51 to 54 are in an OFF state, respectively.

Figure 19B:
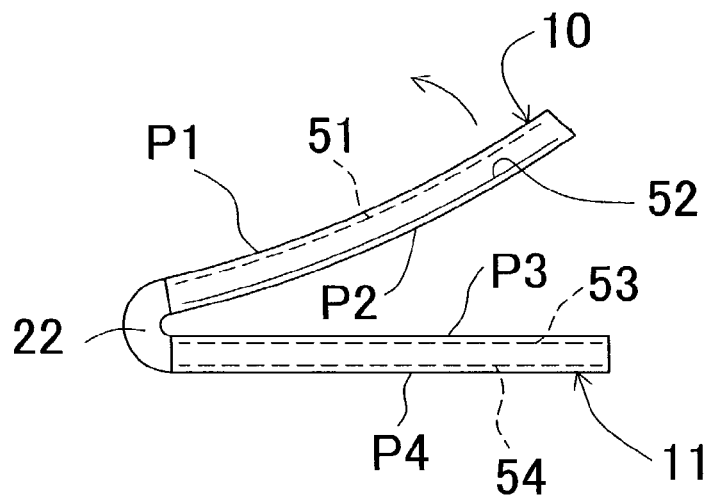
Figure 19C:
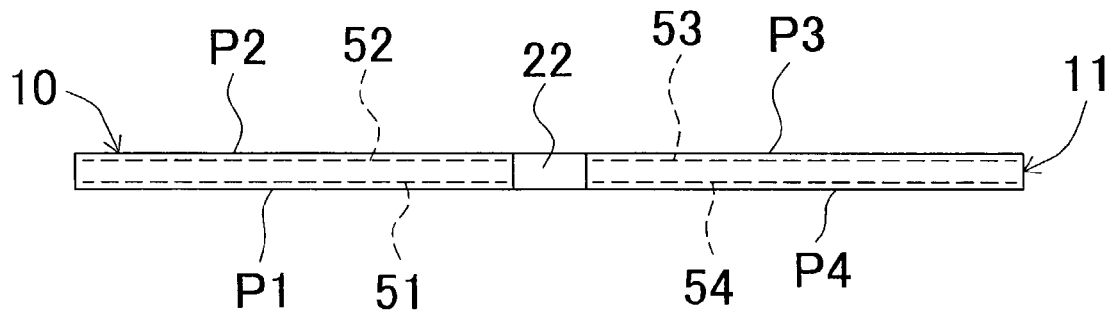

When the image displaying member 10 is turned over in the forward direction as shown by an arrow in FIG. 19B from the initial state (i.e., when the first and second sides are disposed at the left side), the second side which is the display surface 10b of the image displaying member 10 is extended, and therefore the detection element 52 is turned ON. As the image displaying member 10 is completely opened leftwards as shown in FIG. 19C, the second and third pages are displayed on the second and third sides, respectively. At this time, the detection elements 51 to 54 are turned OFF, respectively.

Figure 19D:
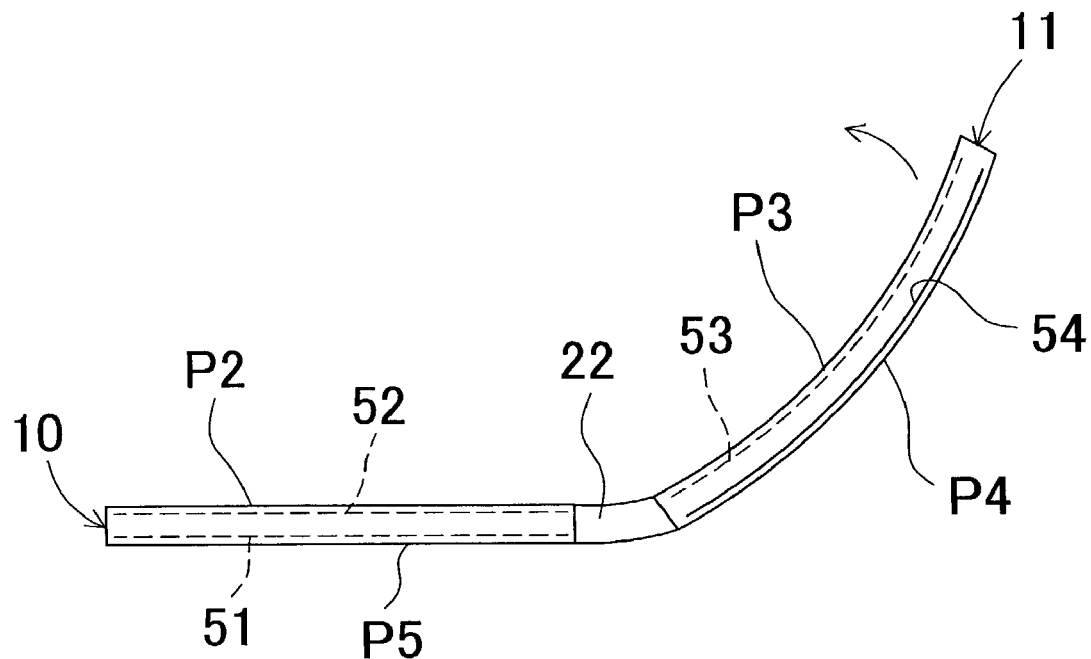
Figure 19E:
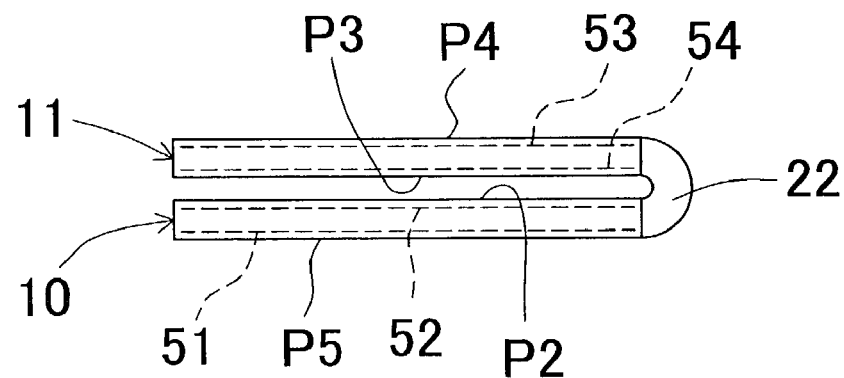

Subsequently, as shown in FIG. 19D, when the image displaying member 11 is turned over (when the third and fourth sides are moved leftwards), the fourth side which is the display surface 11b of the image displaying member 11 is extended, and therefore the detection element 54 is turned ON. As shown in FIG. 19E, when the image displaying member 11 is completely bent and disposed on the other image displaying member 10, a fourth page is displayed on the fourth side, while a fifth page is displayed on the first side which is the display surface 10a of the image displaying member 10. At this time, the detection elements 51 to 54 are turned OFF, respectively.

Figure 19F:
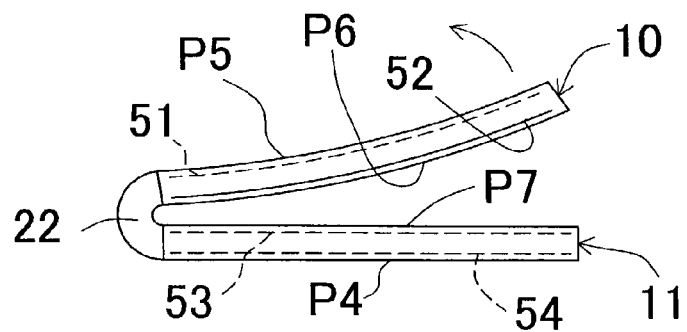

When the entire device is rotated by 180 degrees from the state shown in FIG. 19E so that the first side faces up, as shown in FIG. 19F, the fifth page is displayed on the first side which is the display surface 10a of the image displaying member 10.

In FIG. 19, when the image displaying member 10 is turned over from the state shown in this FIG. 19F (i.e., when the first and second sides 1 and 2 are opened leftwards), the second side which is the display surface 10b of the image displaying member 10 is extended, the detection element 52 is turned ON, and the sixth and seventh pages are displayed on the second and third sides, respectively. Then, in the state in which the image displaying member 10 is completely opened as shown in FIG. 19G, the detection elements 51 to 54 are turned OFF, respectively.

Figure 19G:
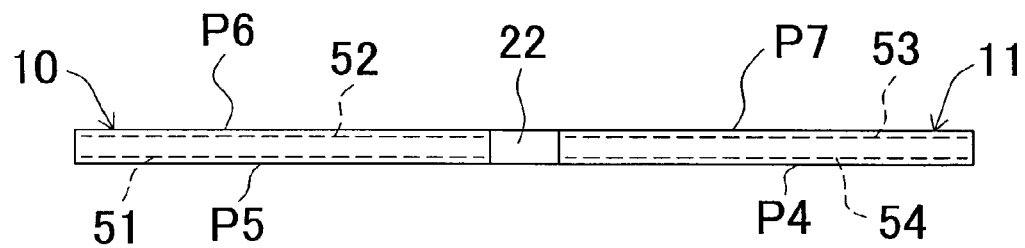
Figure 19H:
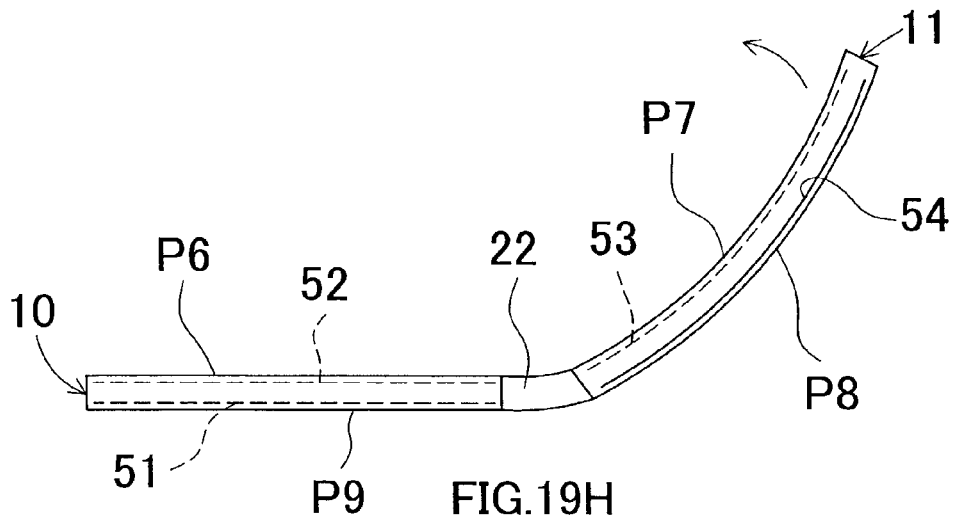
Figure 19I:
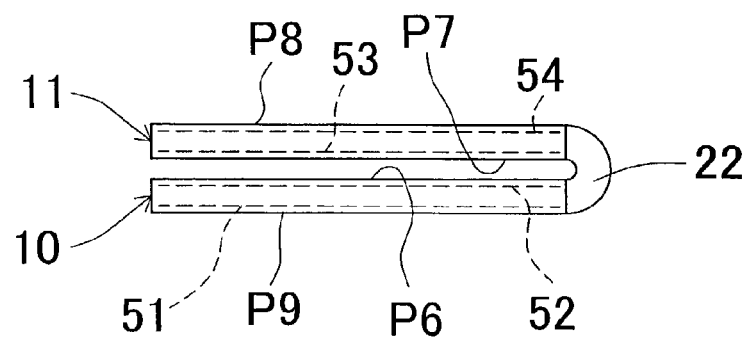

From the state shown in FIG. 19G, when the image displaying member 11 is turned over as shown in FIG. 19H (i.e., when the third and fourth sides are opened leftwards), the fourth side which is the display surface 11b of the image displaying member 11 is extended, and therefore the detection element 54 is turned ON. Thus, the eight and ninth pages are displayed on the fourth and first sides, respectively. As shown in FIG. 19I, in the state in which the image displaying member 11 overlaps on the other image displaying member 10, the detection elements 51 to 54 are turned OFF, respectively.

<Page Reverse Direction Updating>

Figure 20A:
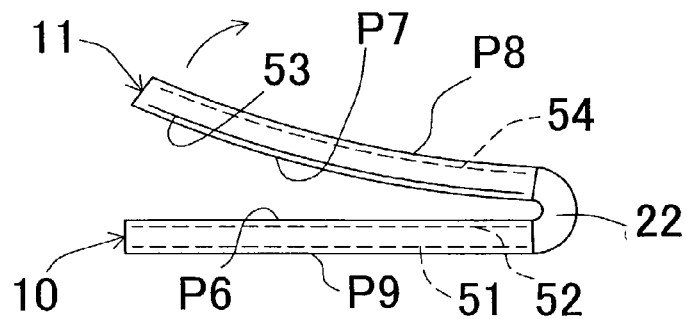
FIGS. 20A to 20H are explanatory drawings showing the page reverse direction updating of the electronic book.
Figure 20B:
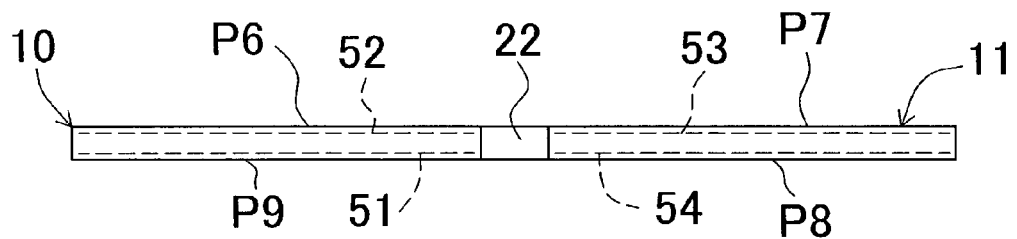

In FIG. 20, when the image displaying member 11 is turned over rightwards from the state shown in FIG. 20A (i.e., the third and fourth sides are opened rightwards), the third side which is the display surface 11a of the image displaying member 11 is extended, and the detection element 53 is turned ON. As shown in FIG. 20B, when the image displaying member 11 is opened completely, the detection elements 51-54 are turned OFF, respectively.

Figure 20C:
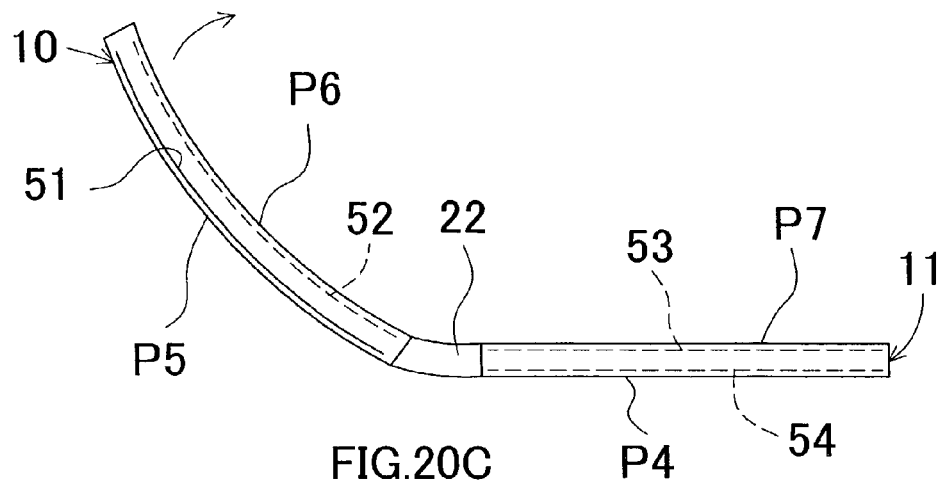
Figure 20D:
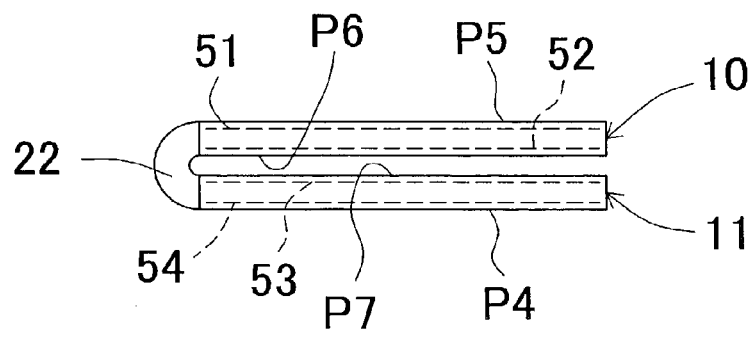

Subsequently, when the image display device 10 is opened rightwards as shown in FIG. 20C, the first side of the image displaying member 11 is extended, and therefore the detecting element 51 is turned ON, and the fifth and fourth pages are displayed on the first and fourth sides, respectively. As shown in FIG. 20D, when the image displaying member 11 is completely folded rightwards, the detection elements 51 to 54 are turned OFF, respectively.

Figure 20E:
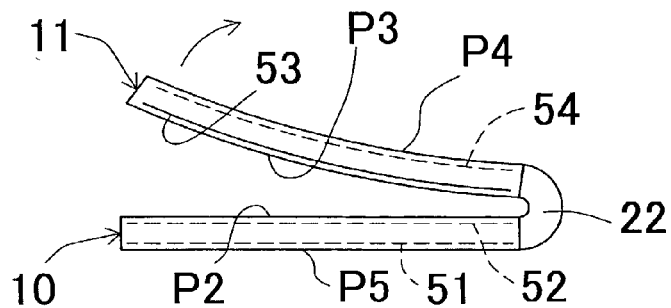

When the entire device is rotated by 180 degrees from the state shown in FIG. 20D, the fourth page is displayed on the fourth side which is the display surface 11*b* of the image displaying member 11 as shown in FIG. 20E.

Then, when the image displaying member 11 is turned over rightwards from the state shown in FIG. 20E (i.e., when the third and fourth sides are opened rightwards), the third side which is the display surface 11*a* of the image displaying member 11 is extended, and therefore the detection element 53 is turned ON, and the third and second pages are displayed on third and second sides, respectively. When the image displaying member 11 is completely opened rightwards as shown in FIG. 20F, the detection elements 51 to 54 are turned OFF, respectively.

Figure 20F:
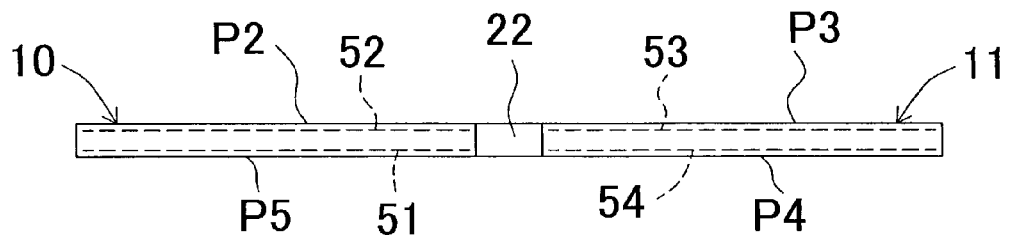

Furthermore, when the image displaying member 10 is turned over rightwards from the state shown in FIG. 20F (i.e., when the first and second sides are opened rightwards).

Figure 20G:
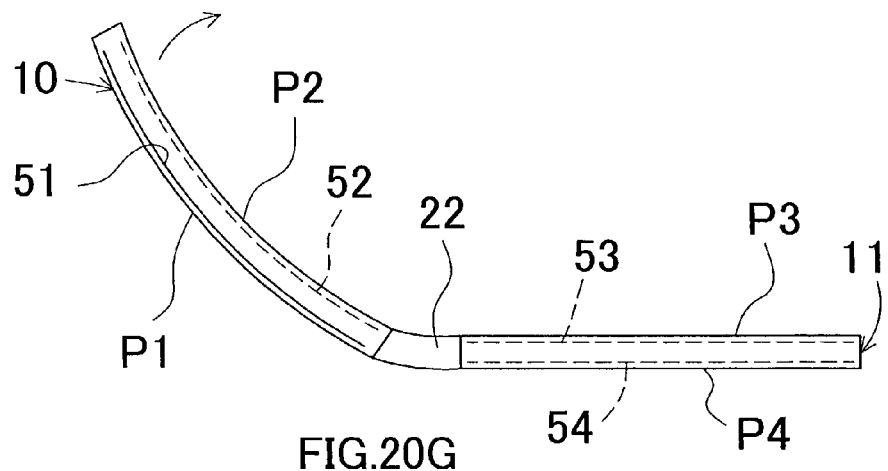
Figure 20H:
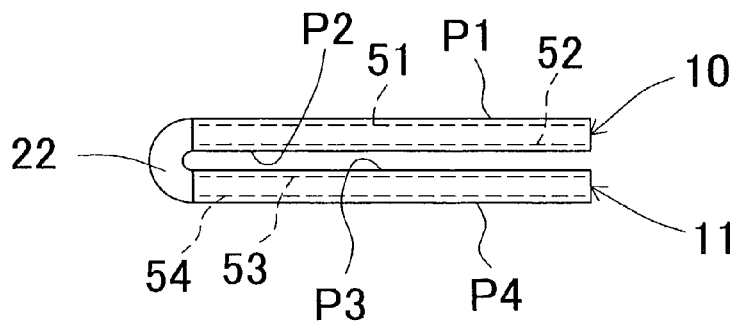

In the state shown in FIG. 20G, the first side which is the display surface 10*a* of the image displaying member 10 is extended, and therefore the detection element 51 is turned ON, and the first page is displayed on the first side. When the image displaying member 10 is folded rightwards completely as shown in FIG. 20H, the detection elements 51 to 54 are turned OFF, respectively.

The ON/OFF state of the detection elements 51 to 54 and the display pages in accordance with the turning-over operation of the aforementioned image displaying members 10 and 11 are collectively shown in FIG. 21.

In the electronic book having the aforementioned structure, the curve deformation of the image displaying members 10 and 11 to which a page turning-over operation was performed is detected by the detection elements 51 to 52, and the page forward and reverse updating can be performed easily.

Next, the third embodiment of the present invention will be explained with reference to the drawings.

Figure 22:
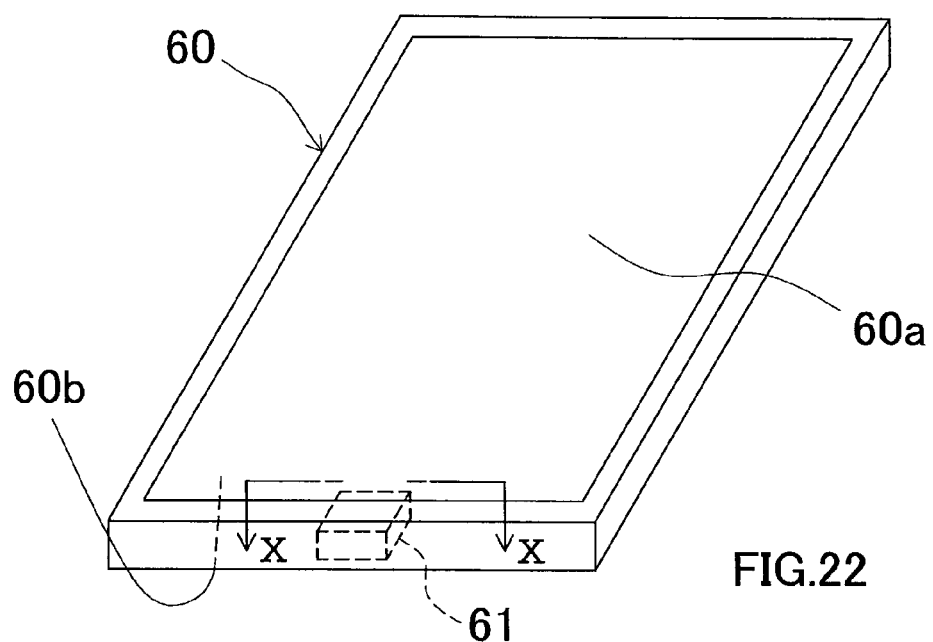
FIG. 22 is a perspective view showing an electronic book to which an image displaying device according to the third embodiment of the present invention.
Figure 23:
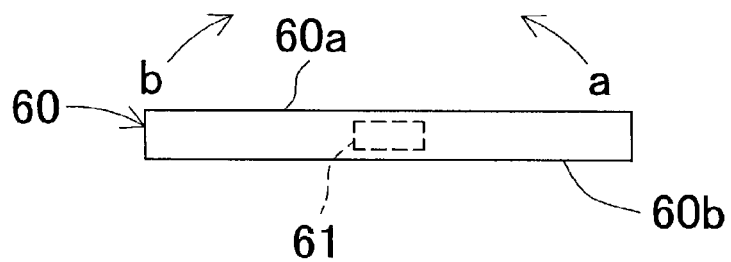
FIG. 23 is a front side view showing the electronic book.

FIG. 22 is a perspective view showing the electronic book to which the image displaying device according to the third embodiment of the present invention is applied. FIG. 23 is a front side view of the electronic book.

In FIGS. 22 and 23, the front surface side of the thin plate-like main body 60 constitutes a first display portion 60*a* capable of changing display contents, while the rear surface side constitutes a second display portion 60*b* capable of changing display contents. In case of updating in the page forward direction, the main body is turned over, for example, in the first direction by 180 degrees, i.e., the direction of the arrow "a" (in a forward direction). To the contrary, in case of updating in the page reverse direction, the main body is turned over, for example, in the second direction by 180 degrees, i.e., the direction of the arrow "b" (in a reverse direction).

In the main body 60, a turning-over detection portion 61 which detects the forward and reverse turning-over respectively is built in.

Figure 24:
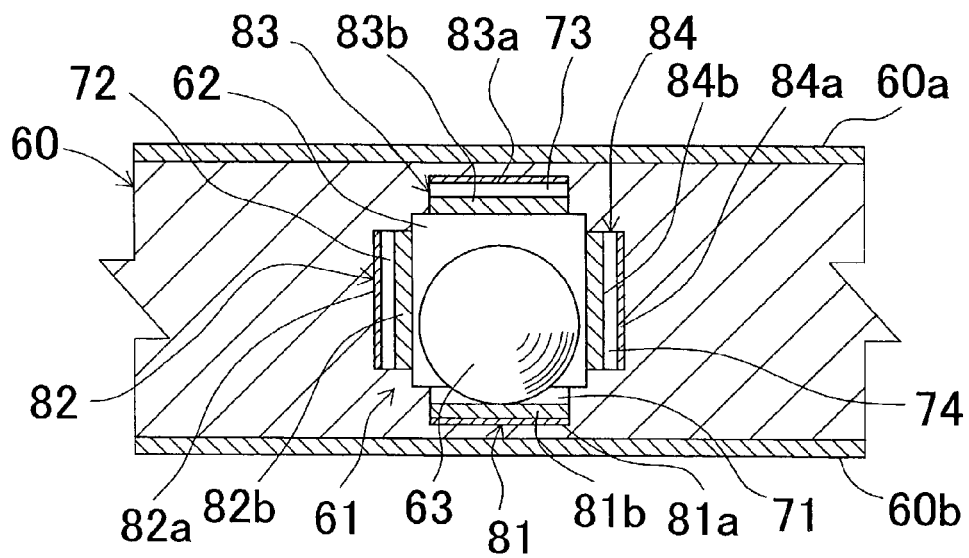
FIG. 24 is a cross-sectional view taken along the line X-X in FIG. 22.

As shown in FIG. 24, this turning-over detection portion 61 is provided with a spherical member holding space 62 formed in the main body 60, a spherical member 63 as an operating member accommodated in the spherical member holding space 62, upper, lower, right and dented portion 71, 73 and 72 and 74 formed in walls of the spherical member holding space 62, detection switches 81, 82, 83 and 84 disposed in each dented portion 71 to 74, respectively.

The detection switch 81 is comprised of a fixed contact segment 81*a* fixed in the dented portion 71 and a movable contact segment 81*b* which is operated by the spherical member 63 and elastically supported by a spring member (not shown) so as to go away from the fixed contact segment 81*a*.

The detection switch 82 is also comprised of a fixed contact segment 82*a* fixed in the dented portion 72 and a movable contact segment 82*b* which is operated by the spherical member 63 and elastically supported by a spring member (not shown) so as to go away from the fixed contact segment 82*a*.

The detection switch 83 is also comprised of a fixed contact segment 83*a* fixed in the dented portion 73 and a movable contact segment 83*b* which is operated by the spherical member 63 and elastically supported by a spring member (not shown) so as to go away from the fixed contact segment 83*a*.

The detection switch 84 is also comprised of a fixed contact segment 84*a* fixed in the dented portion 74 and a movable contact segment 84*b* which is operated by the spherical member 63 and elastically supported by a spring member (not shown) so as to go away from the fixed contact segment 84*a*.

In other words, the rolling of the spherical member 63 rolls at the time of the turning-over of the main body 60 presses any one of movable contact segment 81*b* to 84*b*, causing the contact of the movable contact segment 81*b* to 84*b* and the corresponding fixed contact segment 81*a* to 84*b*, which results in a turning ON of the detection switch 81 to 84. Based on the turn-ON order of the detection switches 81 to 84, the turning-over direction of the main body 60 is detected and the display contents of the predetermined display portion 60*a* and 60*b* is changed.

Figure 25:
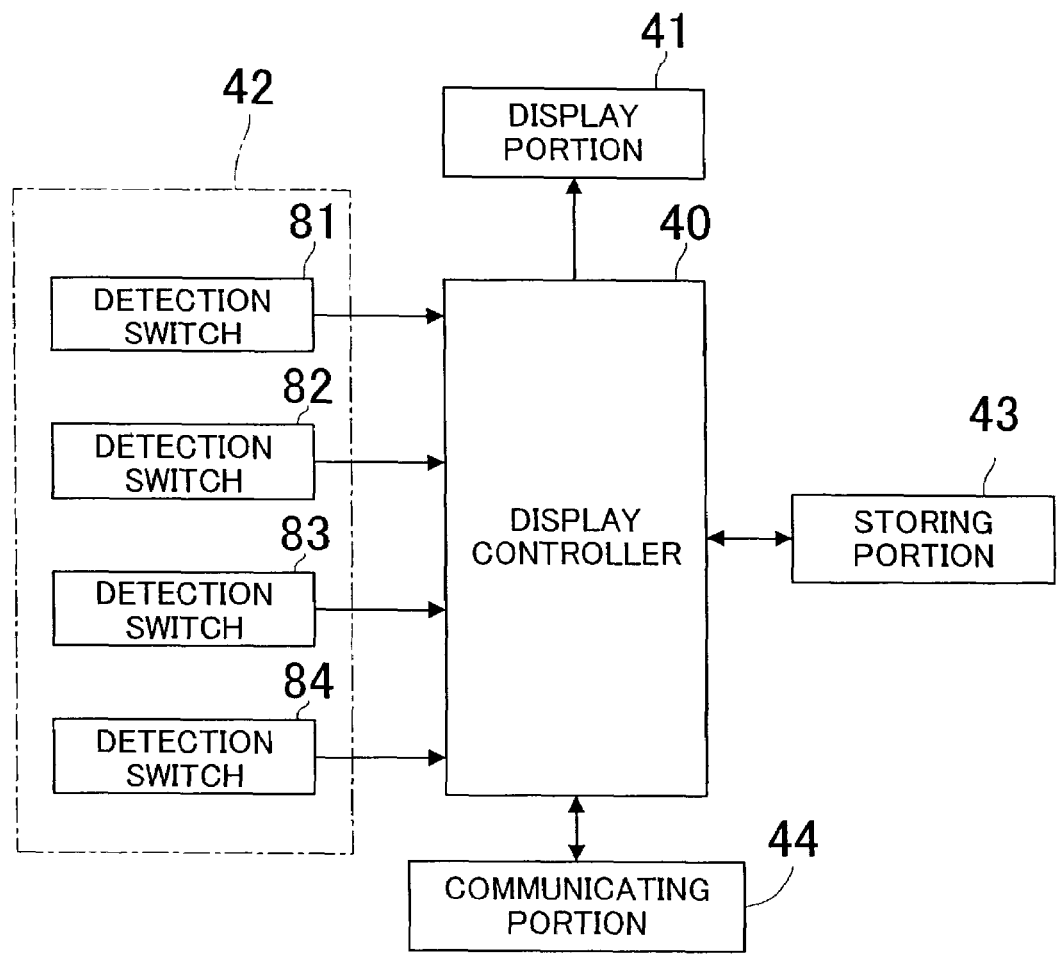
FIG. 25 is a block diagram showing the electric structure of the electronic book.

FIG. 25 is a block diagram showing the electric structure of the aforementioned electronic book.

In FIG. 25, the electronic book is equipped with a display portion 41 including first and second display portions 60*a* and 60*b*, an input portion 42, a display controller 40 equipped with a CPU, etc., a storing portion 43 that stores display contents and a communicating portion 44. The display controller 40, the storing portion 43 and the communicating portion 44 are also built in the main body 60.

The first and second display portions 60*a* and 60*b* display the image data specified by the display controller 40.

Figure 26:
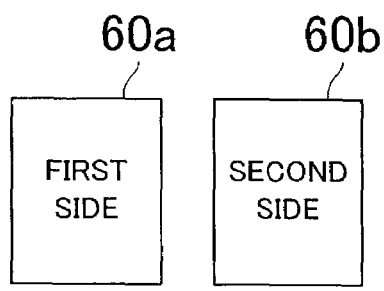
FIG. 26 shows displaying surfaces in a developed state.

The input portion 42 is equipped with the detection switches 81 to 84. Other than the entire control, the display controller 40 reads out an image data of a predetermined page from the storing portion 43 in accordance with the ON output from the input portion 42, i.e., the ON output from the detection switches 81 to 84 and changes the display contents of the front surface side of the display portion 60*a* (60*b*) among the first and second display portions 60*a* and 60*b* of the main body 60. As shown in FIG. 26, the display portion 60*a* side constitutes the first side of the display surface and the display portion 60*b* side constitutes the second side of the display surface.

Furthermore, the display controller 40 increases one or both display pages of the first and second display portions 60*a* and 60*b* when a turning-over in the first direction is detected, decreases one or both display pages of the first and second display portions 60*a* and 60*b* when a turning-over in the second direction is detected and displays the page on the display portions 60*a* and 60*b*.

Next, regarding the electronic book having the aforementioned structure, the input situations of the input portion 42 and the transitions of the displayed pages of the first and second display portion 60*a* and 60*b* in accordance with the user operations will be explained with reference to the FIGS. 27 and 28.

In FIGS. 27 and 28, the ON states of the detection switches 81 to 84 are shown by solid lines, and the OFF states by dotted lines. Furthermore, the display surfaces of the image display portions 60*a* and 60*b* are shown by the display page numbers.

<Page Forward Direction Updating>

Figure 27A:
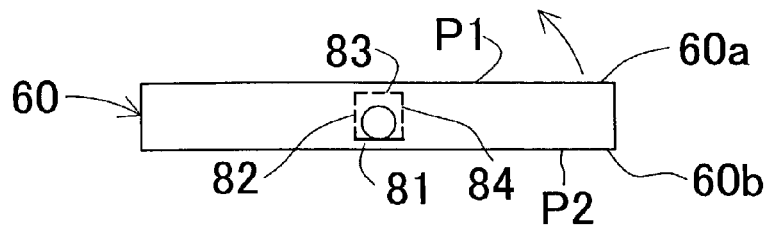
FIGS. 27A to 27H are explanatory drawings showing the page forward direction updating of the electronic book.

As shown in FIG. 27A, in the initial state in which the first display portion 60*a* faces up and only the detection switch 81 is turned ON, the first and second display portions 60*a* and 60*b* constitute the first and second sides, respectively, and display the first and second pages, respectively.

Figure 27B:
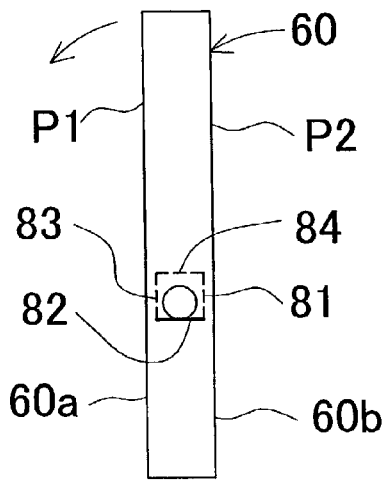
Figure 27C:
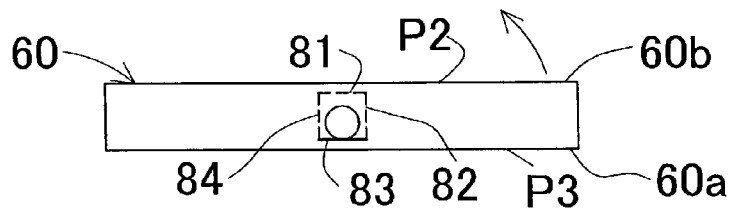

The main body 60 is rotated from this initial state in the first direction which is a counterclockwise direction, and reversed into the state shown in FIG. 27C through the state shown in FIG. 27B. In the middle of turning-over as shown in FIG. 27B, the detection switch 82 is turned ON by the spherical member 63, and in the reversed state shown in FIG. 27C, only the detection switch 83 is turned ON. In this state, the second display portion 60*b* faces up, and the display contents of the second side which is the display surface of the second display portion 60*b* is updated on the second page, and the display contents of the first side which is the display surface of the first display portion 60*a* is updated on the third page. Thus, a user can see the second page displayed on the second side.

Similarly, by repeating the turning-over of the main body 60 in the first direction, the display contents of the first and second display contents are updated in the forward direction (page increase direction).

Figure 27D:
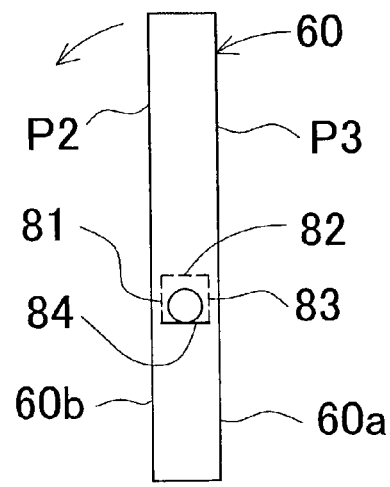
Figure 27E:
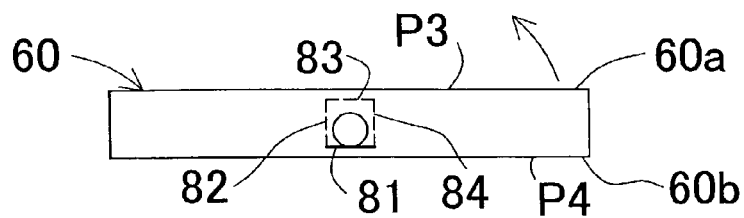

In other words, when the main body 60 is rotated counterclockwise from the state shown in FIG. 27C, only the detection switch 84 is turned ON in the middle of the turning-over shown in FIG. 27D, only the detection switch 81 is turned ON in the reversed state shown in FIG. 27E.

In FIG. 27, in the reversed state shown in FIG. 27E, the first display portion 60*a* faces up, and the third page which is forwardly updated can be seen in the first side, and the display contents of the second side which is the second display contents is forwardly updated on the fourth page.

Figure 27F:
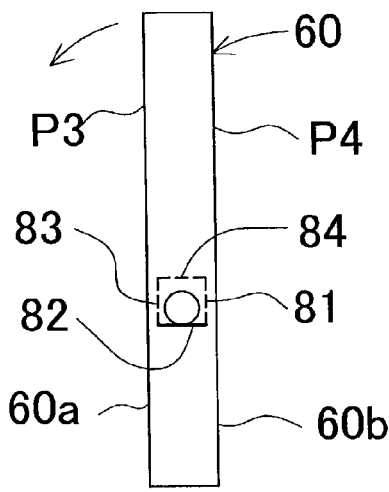
Figure 27G:
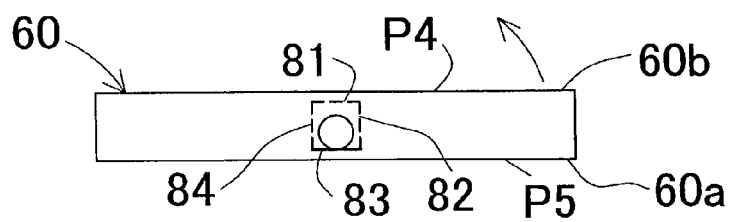
Figure 27H:
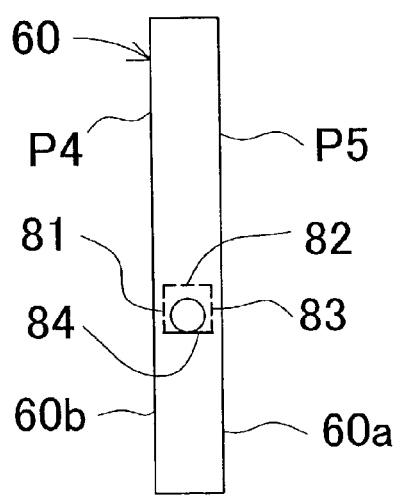

Similarly, in the reversed state shown in FIG. 27G through the turning-over middle state shown in FIG. 27F, the second display portion 60*b* faces up, the fourth page which is forwardly updates on the second side can be seen, and the display contents of the first side which is the first display portion 60*a* is updated forwardly on the fifth page. Thereafter, only the detection switch 84 is turned ON in the middle of the turning-over shown in FIG. 27H.

<Page Reverse Direction Updating>

To the contrary, by rotating the main body 60 in the second direction contrary to the first direction, the display contents of first and second sides are updated in a reverse direction (page decreasing direction).

Figure 28A:
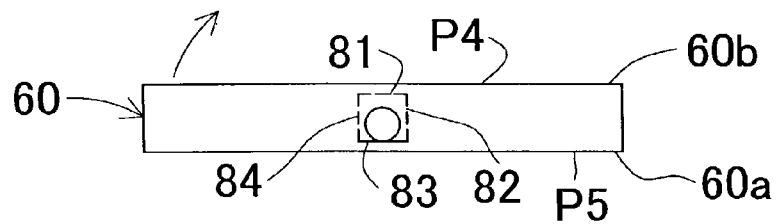
FIGS. 28A to 28G are explanatory drawings showing the page reverse direction updating of the electronic book.

In FIG. 28, it is assumed that the main body 60 is in the state shown in FIG. 28A, i.e., only the detection switch 83 is turned ON, the fourth page is displayed on the second side of the second display portion 60*b* and the fifth page is displayed on the second side of the first display portion 60*a*. The main body 60 is rotated from this state in the second direction, i.e., clockwise, and reversed as shown in FIG. 28C through the state shown in FIG. 28B.

Figure 28B:
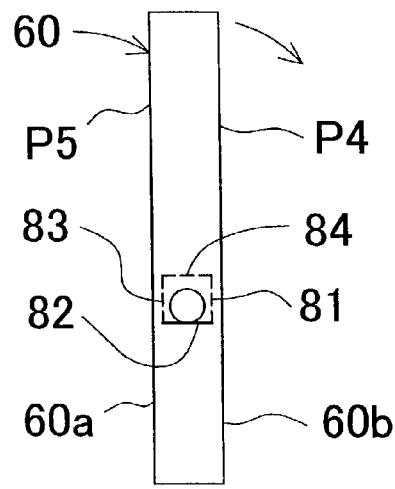
Figure 28C:
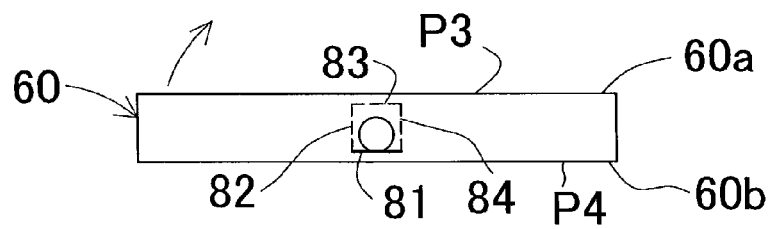

In the middle of turning-over as shown in FIG. 28B, only the detection switch 82 is turned ON by the spherical member 63, and only the detection switch 81 is turned ON in the state of the reversed state shown in FIG. 28C. In this state, the first display portion 60*a* faces up, and the display contents of the first side is reversely updated to the third page.

Figure 28D:
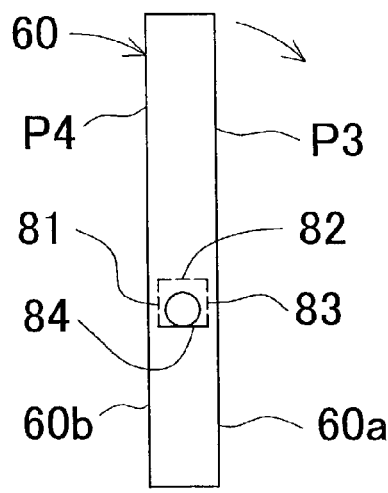
Figure 28E:
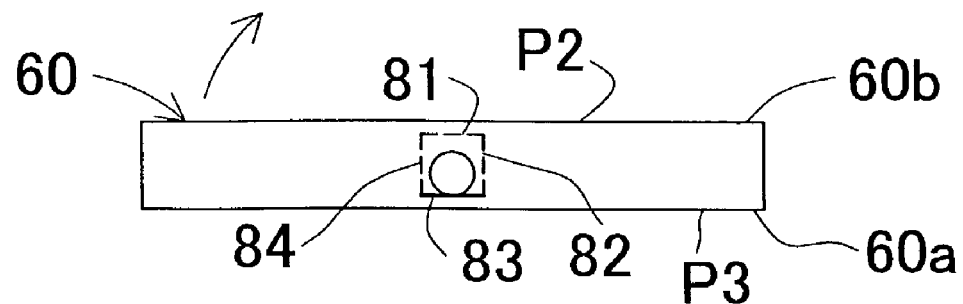

Similarly, when the main body 60 is rotated clockwise, the main body becomes in a reversed state shown in FIG. 28E through the middle of the turning-over in which the detection switch 84 is turned ON as shown in FIG. 28D.

In the reversed state shown in FIG. 28E, the second display portion 60*b* faces up, and the display contents of the second side is reversely updated to the second page.

Figure 28F:
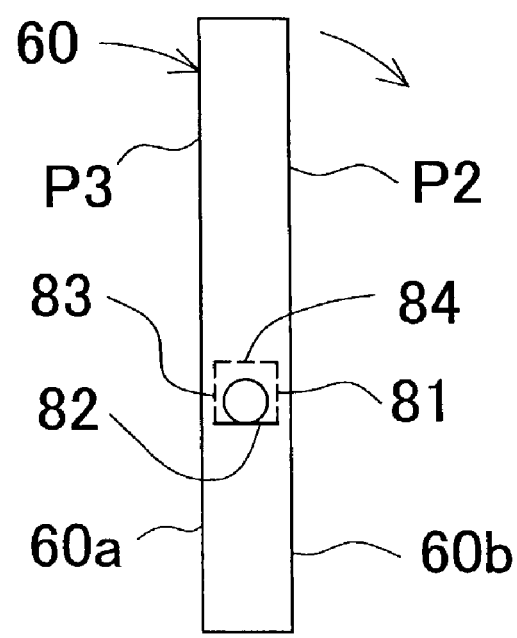
Figure 28G:
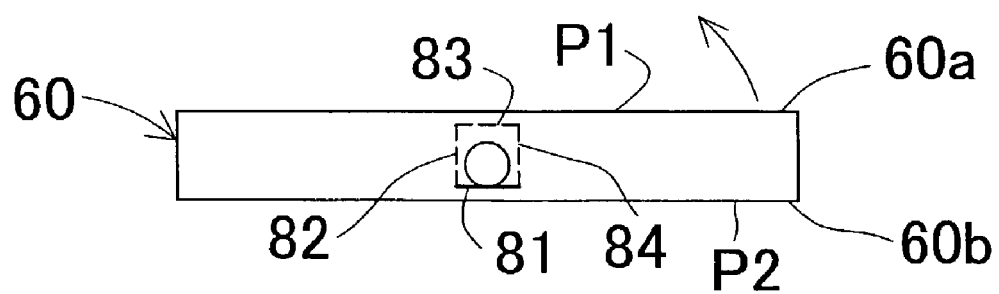

By further rotating the main body 60 clockwise, the main body becomes in a reversed state as shown in FIG. 28G through the middle of the turning-over state in which the detection switch 82 is turned ON as shown FIG. 28F. In the reversed state, the first side which is the first display portion 60*a* faces up, and the display contents of the first side is reversely updated to the first page.

The ON-OFF state and the displayed page in accordance with the turning-over operation which is a turning-over operation of the main body 60 are collectively shown in FIG. 29.

Thus, by the simple turning-over operation of the main body 60, the turning-over direction can be detected, the page updating can be performed easily and the turning-over operation is not restrained by the number of pages. This enhances the operability of the device.

The turning-over detecting means is not limited to a structure employing the aforementioned spherical member, but may be any structure.

Figure 8:
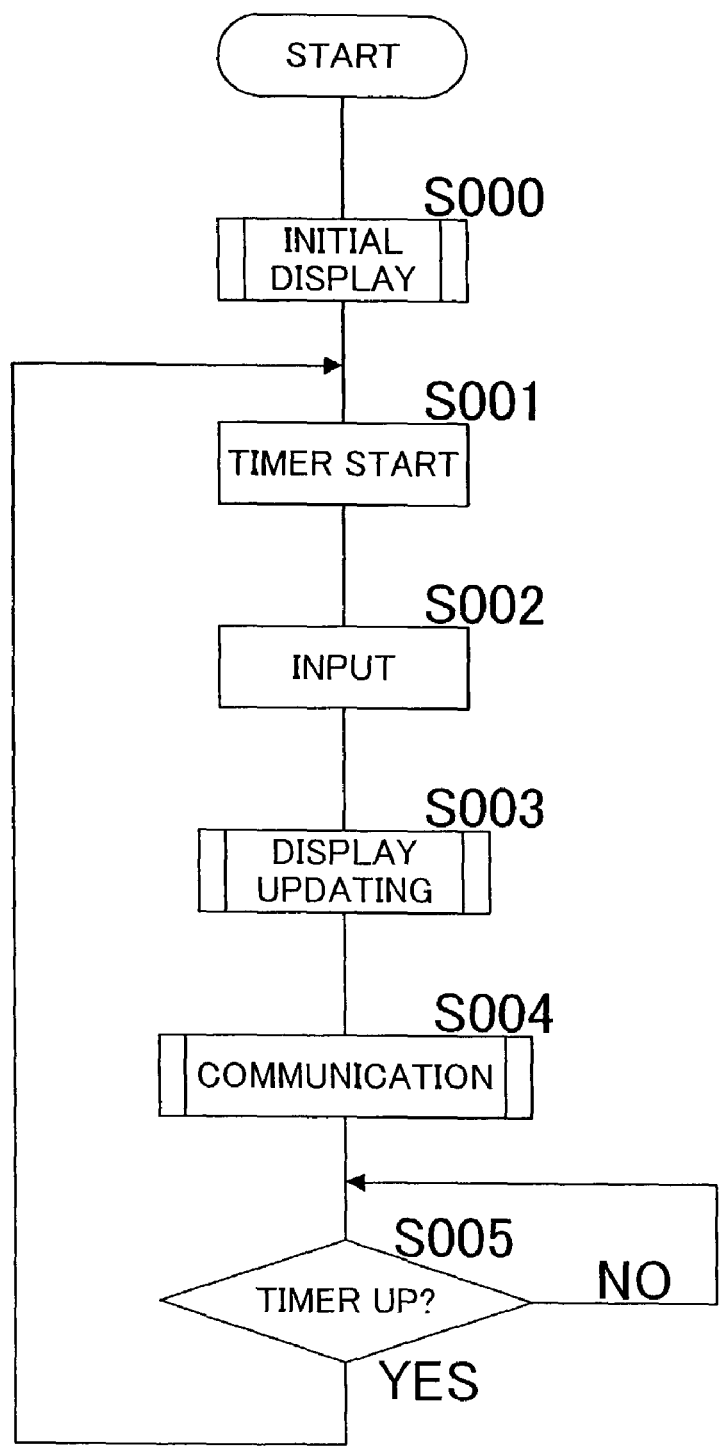
FIG. 8 is a flowchart showing the control flow of the electronic book.

The processing in the display controller 40 of the electronic book according to the third embodiment is performed in the same flow as in the processing of the first embodiment shown in FIG. 8.

Figure 30:
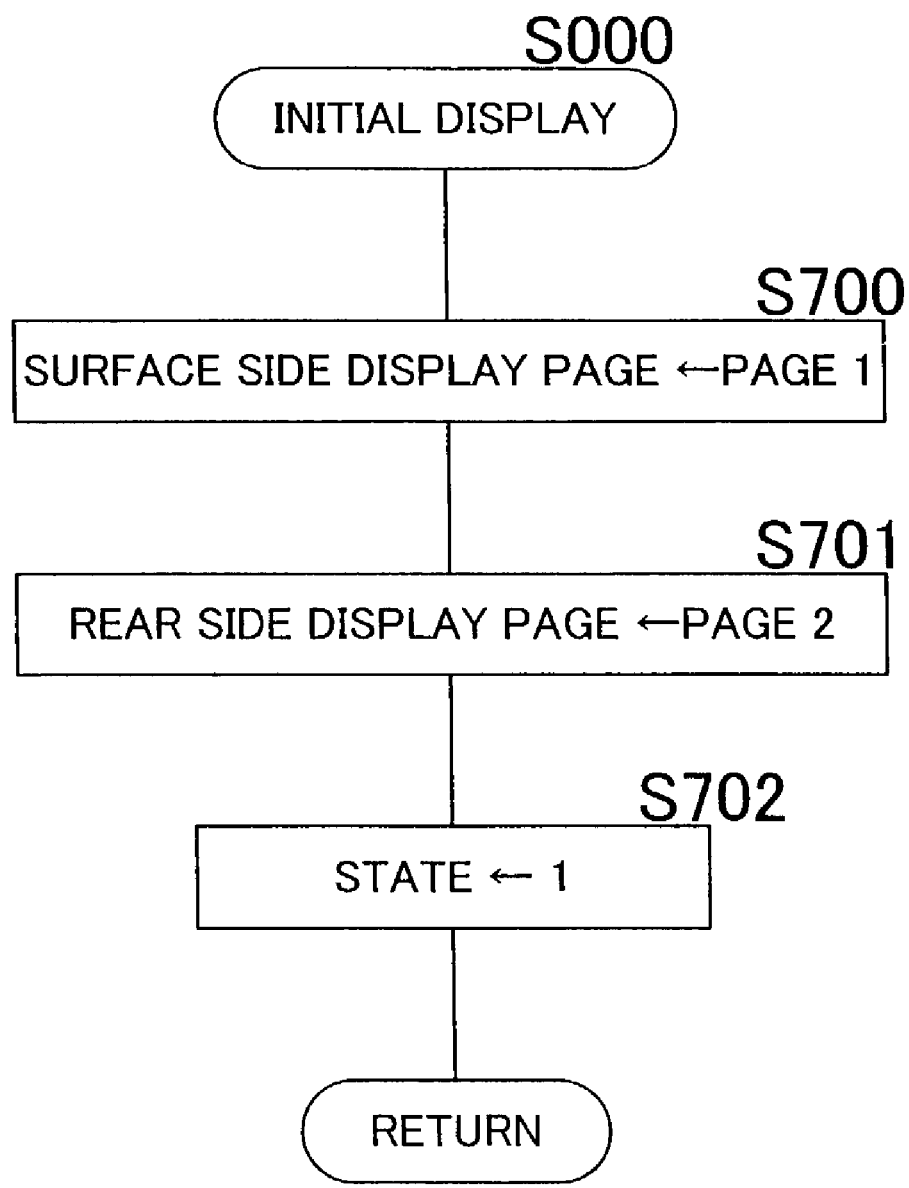
FIG. 30 is a flowchart showing the flow of processing for the initial display.

Next, the contents of the initial display processing (S000 in FIG. 8) in the third embodiment will be explained with reference to the flowchart shown in FIG. 30.

First, in S700, the first page image is read out from the storing portion 43, and gives it to the first side which is the first display portion 60*a*. In S701, the second page image is read out from the storing portion 43, and gives it to the second side which is the second display portion 60*b*.

Thereafter, a variable St used for the state judgment in the display update process is initialized to "1" in S702.

Next, the contents of the display update process (S003 in FIG. 8) will be explained with reference to the flowchart shown in FIGS. 31 and 32.

Figure 31:
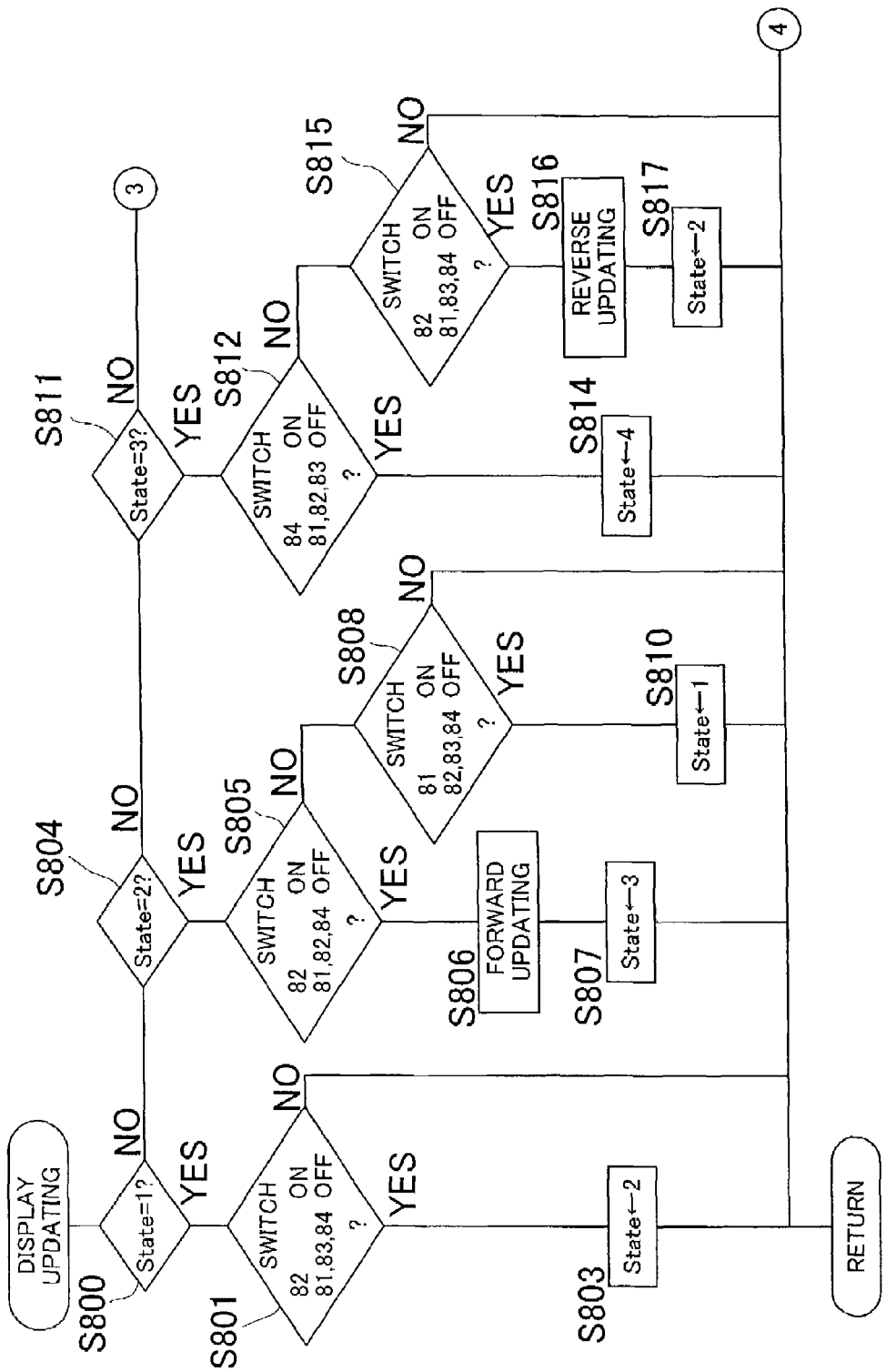
FIG. 31 is a flowchart showing the flow of the display updating process.

In FIG. 31, it is discriminated whether the state judgment variable St is "1" in S800. If the state judgment variable St is "1" (YES in S800), in S801, it is discriminated whether the detection switch 82 of the turning-over detection portion 61 is ON and the other switches 81, 83 and 84 are OFF, respectively.

If the detection switch 82 is ON and other detection switches 81, 83 and 84 are OFF, respectively (YES in S801), the state judgment variable St is set to "2" in S803, and the routine returns.

If the detection switch 82 is not turned ON or other detection switches 81, 83 and 84 are not turned OFF (NO in S801), the routine returns as it is.

In S800, if the state judgment variable St is not "1" (NO in S800), in S804, it is discriminated whether the state judgment variable St is "2." If the state judgment variable St is "2" (YES in S804), in S805, it is discriminated whether the detection switch 83 is turned ON and other switches 81, 82 and 84 are turned OFF, respectively.

If the detection switch 83 is turned ON and other detection switches 81, 82 and 84 are turned OFF, respectively (YES in S805), page forward updating is performed in S806, and the state judgment variable St is set to "3" in S807. Then, the routine returns. In this case, the following page is displayed on the first page which faces down.

If the detection switch 83 is not turned ON and other detection switches 81, 82 and 84 are not turned OFF (NO in S805), it is discriminated whether the detection switch 81 is turned ON and other detection switches 82, 83 and 84 are turned OFF in S808. If the detection switch 81 is turned ON and the detection switches 82, 83 and 84 are turned OFF (YES in S808), the state judgment variable St is set to "1" in S810, and the routine returns.

If it is not that the detection switch 81 is turned OFF and the detection switches 82, 83 and 84 are turned OFF (NO in S808), the routine returns as it is.

If the state judgment variable St is not "2" (NO in S804), it is discriminated whether the state judgment variable St is "3" in S811. If the state judgment variable St is "3" (YES in S811), in S812 it is discriminated whether the detection switch 84 of the turning-over detection portion 61 is turned ON and other detection switches 81, 82 and 83 are turned OFF.

If the detection switch 84 is turned ON and other detection switches 81, 82 and 83 are turned OFF, respectively (YES in S812), the state judgment variable St is set to "4" in S814, and the routine returns.

If it is not that the detection switch 84 is turned ON and the detection switches 81, 82 and 83 are not turned OFF (NO in S812), in S815, it is discriminated whether the detection switch 82 of the turning-over detection portion 61 is turned ON and the detection switches 81, 83 and 84 are turned OFF, respectively. If the detection switch 82 is turned ON and the detection switches 81, 83 and 84 are turned OFF, respectively (YES in S815), the page reverse updating is performed in S816 and the state judgment variable St is set to "2" in S817. Then, the routine returns.

If it is not that the detection switch 82 is turned ON and other detection switches 81, 83 and 84 are not turned OFF (NO in S815), the routine returns as it is.

Figure 32:
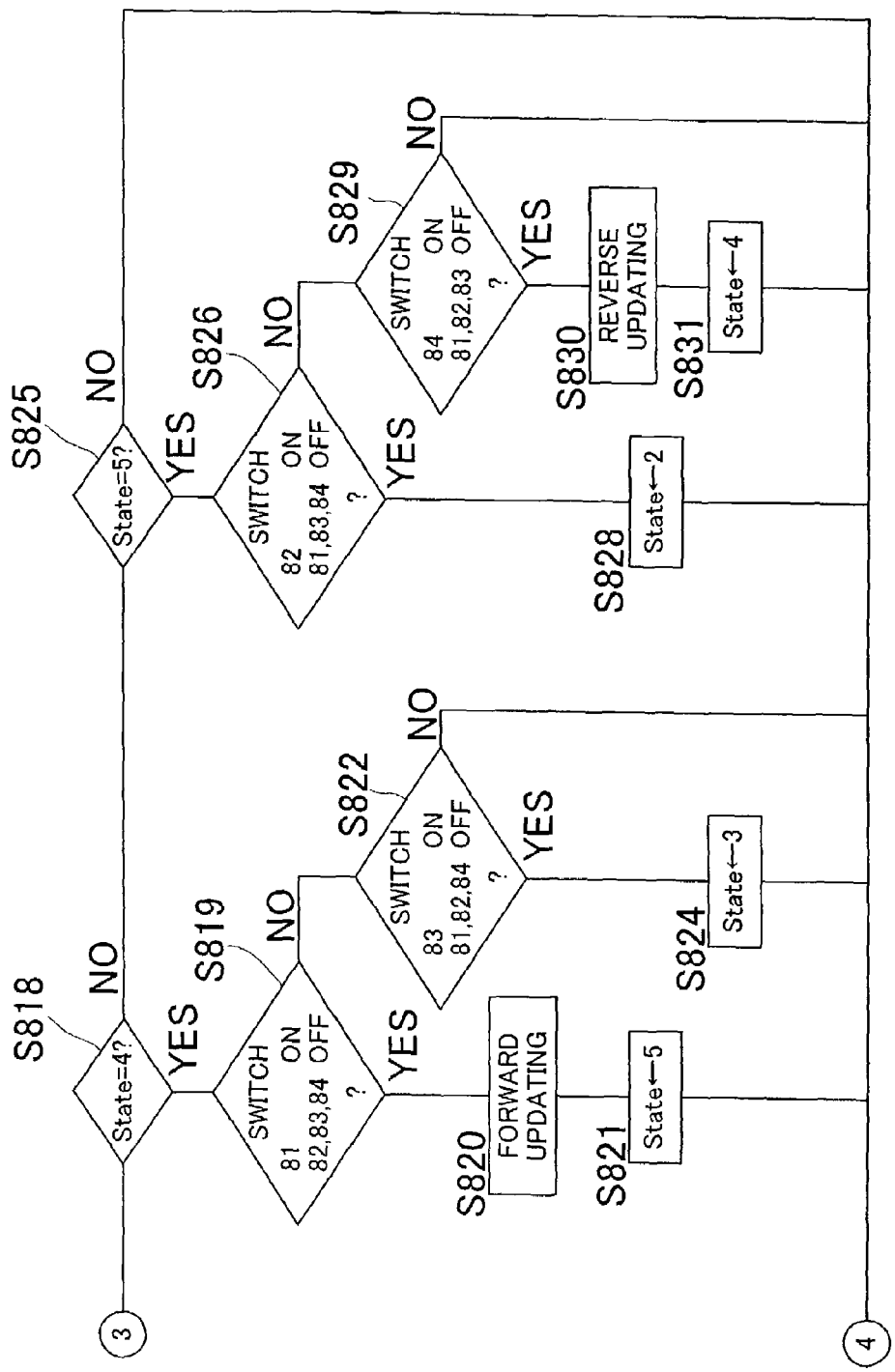
FIG. 32 is a flowchart showing the flow following FIG. 31.

If the state judgment variable St is not "3" (NO in S811), the routine proceeds to S818 in FIG. 32.

In FIG. 32, it is discriminated whether the state judgment variable St is "4" in S818. If the state judgment variable St is "4" (YES in S818), in S819 it is discriminated whether the detection switch 81 of the turning-over detection portion 61 is turned ON and other detection switches 82, 83 and 84 are turned OFF, respectively.

If the detection switch 81 is turned ON and other detection switches 82, 83 and 84 are turned OFF, respectively (YES in S819), in S820 the page forward updating is performed and in S821 the state judgment variable St is set to "5" in S821. Then, the routine returns.

If it is not that the detection switch 81 is turned ON and other detection switches 82, 83 and 84 are turned OFF, respectively (NO in S819), in S822, it is discriminated whether the detection switch 81 of the turning-over detection portion 61 is turned ON and other detection switches 81, 82 and 84 are turned OFF. If the detection switch 83 is turned ON and other detection switches 82, 83 and 84 are turned OFF, respectively (YES in S822), the state judgment variable St is set to "3" in 824, and the routine returns.

If it is not that the detection switch 83 is turned ON and other detection switches 81, 82 and 84 are turned OFF (NO in S822), the routine returns as it is.

If the state judgment variable St is not "4" (NO in S818), in S825, it is discriminated whether the state judgment variable St is "5." If the state judgment variable St is not "5" (NO in S825), the routine returns as it is.

If the state judgment variable St is "5" (YES in S825), in S826, it is discriminated whether the detection switch 82 of the turning-over detection portion 61 is turned ON and other detection switches 81, 83 and 84 are turned OFF, respectively.

If the detection switch 82 is turned ON and other detection switches 81, 83 and 84 are turned OFF, respectively (YES in S826), the state judgment variable St is set to "2" in S828. Then, the routine returns.

If it is not that the detection switch 82 is turned ON and other detection switches 81, 83 and 84 are not turned OFF (NO in S826), in S829, it is discriminated whether the detection switch 84 of the turning-over detection portion 61 is turned ON and other detection switches 81, 82 and 83 are turned OFF, respectively. If the detection switch 84 is turned ON and other detection switches 81, 82 and 83 are turned OFF (YES in S829), the page reverse updating is performed in S830 and the state judgment variable St is set to "4" in S831. Then, the routine returns.

If it is not that the detection switch 84 is turned ON and other detection switches 81, 82 and 83 are turned OFF (NO in S829, the routine returns as it is.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims. The present invention permits any design-change, unless it deviates from the soul, if it is within the limits by which the claim was performed.

What is claimed is:

1. An image displaying device, comprising:
a first display portion capable of changing display contents and provided at a front surface side of a main body;
a second display portion capable of changing display contents and provided at a back surface side of said main body;
a detector which detects a turning-over of said main body; and
a display controller capable of changing the display contents of said first or second display portion depending on a detected result of said detector, wherein
said detector detects whether the turning-over of said main body is in the first direction or in the second direction based on a transition of ON state to OFF state of each detector and vice versa, wherein said detector has a spherical member disposed within a space provided in said main body and switches arranged on upper, lower, right and left sides of said space to detect the turning-over of said main body when said spherical member turns on/off said switches.

2. An image displaying device, comprising:
a plurality of sheet-like image displaying members having two image display sides capable of changing display contents to display a different image, the plurality of sheet-like image displaying members being bound to each other so as to open and close each of said image display sides;
a detector that detects whether each of said image display sides are opened or closed; and
a display controller that changes display contents of one or a plurality of certain image display sides depending on a detected result of said detector, wherein said display controller changes the display contents of said image displaying member into subsequent display contents or previous display contents depending on a page turning-over direction of said image displaying member, wherein said detector detects whether each of said display sides is in an opened state or in a closed state by detecting a curve deformation of said image displaying member.

3. An image displaying device, comprising:
a plurality of sheet-like image displaying members having two image display sides capable of changing display contents to display a different image, the plurality of sheet-like image displaying members being bound to each other so as to open and close each of said image display sides;

a detector that detects whether each of said image display sides are opened or closed; and a display controller that changes display contents of one or a plurality of certain image display sides depending on a detected result of said detector, wherein said display controller changes the display contents of said image displaying member into subsequent display contents or previous display contents depending on a page turning-over direction of said image displaying member, wherein said detector also discriminates a page turning-over direction of said image displaying member by detecting a curve deformation of said image displaying member.

* * * * *